US012654481B2

(12) United States Patent
Matsuda et al.

(10) Patent No.: US 12,654,481 B2
(45) Date of Patent: Jun. 16, 2026

(54) IMAGE FORMING SYSTEM

(71) Applicant: CANON KABUSHIKI KAISHA, Tokyo (JP)

(72) Inventors: Tomoki Matsuda, Shizuoka (JP); Kenji Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/883,910

(22) Filed: Sep. 12, 2024

(65) Prior Publication Data

US 2025/0093808 A1 Mar. 20, 2025

(30) Foreign Application Priority Data

Sep. 14, 2023 (JP) ................................ 2023-149009

(51) Int. Cl.

| | |
|---|---|
| ***B65H 37/04*** | (2006.01) |
| ***B42C 9/00*** | (2006.01) |
| ***B65H 39/10*** | (2006.01) |
| ***G03G 15/00*** | (2006.01) |

(52) U.S. Cl.

CPC ........... *B42C 9/0081* (2013.01); *B65H 37/04* (2013.01); *B65H 39/10* (2013.01); *G03G 15/6544* (2013.01); *G03G 2215/00835* (2013.01); *G03G 2215/00936* (2013.01)

(58) Field of Classification Search

None

See application file for complete search history.

(56) References Cited

U.S. PATENT DOCUMENTS

| | | | | |
|---|---|---|---|---|
| 9,110,425 | B2 | 8/2015 | Watanabe | |
| 2013/0051886 | A1* | 2/2013 | Watanabe | .......... G03G 15/6544 399/409 |

FOREIGN PATENT DOCUMENTS

| | | | | |
|---|---|---|---|---|
| EP | 0015153 | B1 | 6/1983 | |
| EP | 2465694 | B1 | 7/2015 | |
| JP | 2004209859 | A | 7/2004 | |
| JP | 2005162352 | A * | 6/2005 | ............... B65H 1/00 |
| JP | 2010111025 | A | 5/2010 | |
| JP | 2013126910 | A * | 6/2013 | |
| JP | 2014151579 | A | 8/2014 | |
| JP | 2014237291 | A | 12/2014 | |
| JP | 2015178198 | A | 10/2015 | |
| JP | 2015196567 | A | 11/2015 | |
| WO | 9609935 | A1 | 4/1996 | |

* cited by examiner

*Primary Examiner* — Jennifer Bahls

(74) *Attorney, Agent, or Firm* — Canon U.S.A., Inc. IP Division

(57) ABSTRACT

Each adhesive toner image is formed so that at least one of the adhesive toner image bonding a front cover and a middle page together and the adhesive toner image bonding a back cover and a middle page together becomes greater in area than the adhesive toner image bonding the middle pages together when viewed from a direction perpendicular to a surface of a recording material, and a booklet is generated so that the adhesive toner image bonding the front cover and the middle page together, the adhesive toner image bonding the back cover and the middle page together, and the adhesive toner image bonding the middle pages together overlap when viewed from the direction perpendicular to the surface of the recording material.

13 Claims, 11 Drawing Sheets

IMAGE FORMING SYSTEM

BACKGROUND OF THE INVENTION

Field of the Invention

The present invention relates to an image forming system including a booklet generation apparatus that generates a booklet by applying heat and pressure to an adhesive toner formed on a plurality of recording materials and bonding the plurality of recording materials together.

Description of the Related Art

There are a booklet generation apparatus and an image forming system for forming adhesive toner images on recording materials using an electrophotographic process and bonding the recording materials together to generate a booklet as discussed in Japanese Patent Application Laid-Open No. 2010-111025.

However, the image forming apparatus including the booklet generation apparatus as discussed in Japanese Patent Application Laid-Open No. 2010-111025 may worsen the appearance and quality of a booklet for the following reasons.

For example, there may be a case where recording materials set in a sheet feed cassette by a user are not regulated properly in a width direction depending on the force applied by the user and each recording material is fed and conveyed in a state of being misaligned in the width direction. Further, the recording materials may be misaligned due to various causes during bonding. In a case where such issues occur, a booklet may be generated with an adhesive toner image formed at a misaligned position on each recording material.

In a case where a booklet is generated with an adhesive toner image formed at a misaligned position on each recording material, when the generated booklet is viewed from a front or back cover, the adhesive toner image for bonding inner recording materials of the booklet may become transparently visible outside the adhesive toner image bonding the front or back cover, which worsens the appearance and quality of the booklet.

The present invention is directed to preventing the appearance and quality of a booklet from worsening even in a case where an adhesive toner image is formed at a misaligned position on each recording material.

SUMMARY OF THE INVENTION

According to an aspect of the present invention, an image forming system includes an image forming apparatus configured to form an adhesive toner image on a recording material, and a booklet generation apparatus configured to generate a booklet including a recording material to be a front cover, a recording material to be a back cover, and two or more recording materials to be middle pages between the front cover and the back cover, the booklet generation apparatus including a thermal compression bonding unit configured to heat and press an adhesive toner image portion in a state where a plurality of recording materials each with the adhesive toner image formed thereon is stacked in order to bond the plurality of recording materials together, wherein each adhesive toner image is formed so that at least one of the adhesive toner image bonding the front cover and the middle page together and the adhesive toner image bonding the back cover and the middle page together becomes greater in area than the adhesive toner image bonding the middle pages together when viewed from a direction perpendicular to a surface of the recording material, and wherein the booklet is generated so that the adhesive toner image bonding the front cover and the middle page together, the adhesive toner image bonding the back cover and the middle page together, and the adhesive toner image bonding the middle pages together overlap when viewed from the direction perpendicular to the surface of the recording material.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

DESCRIPTION OF THE EMBODIMENTS

Figure 1:
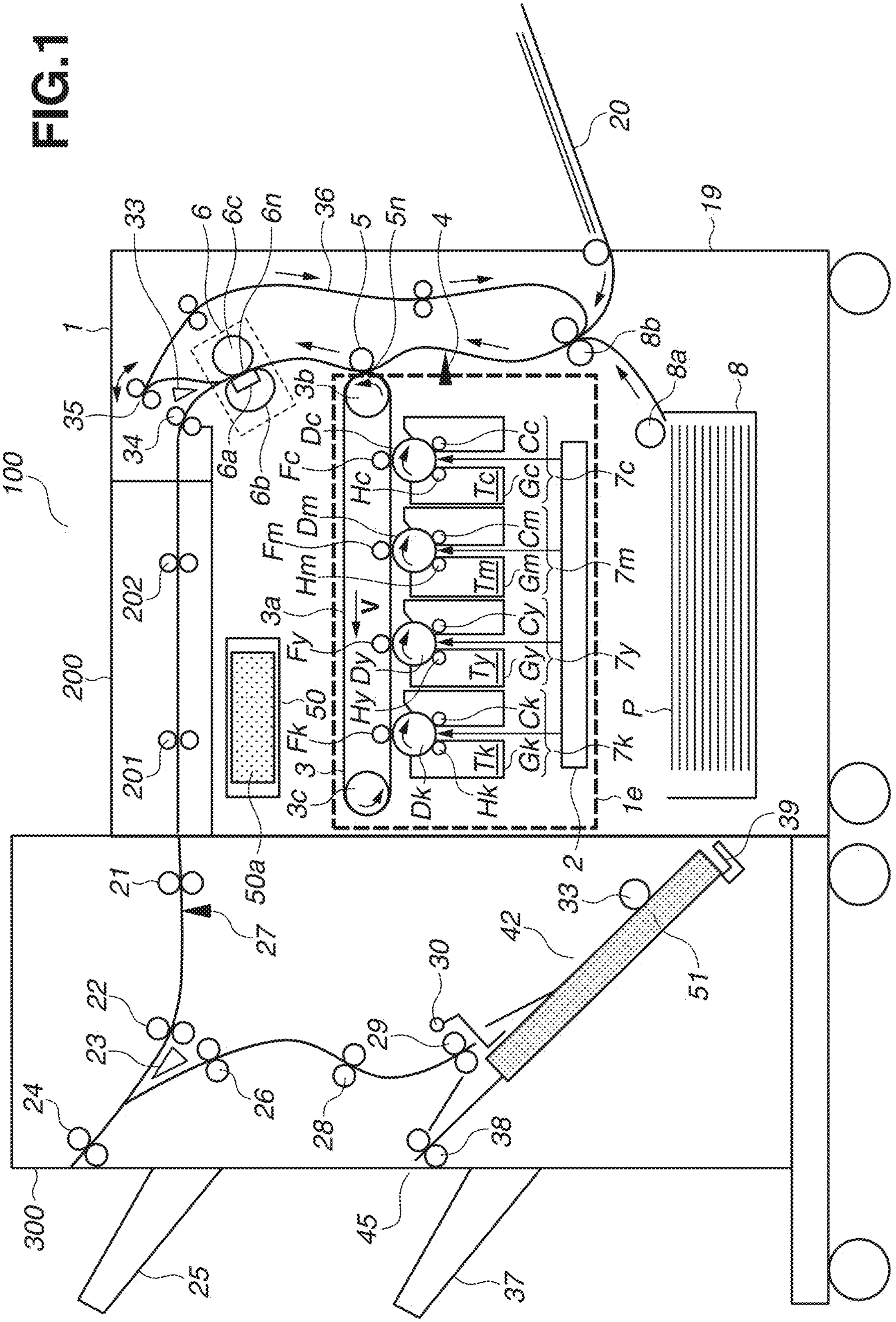
FIG. 1 is a cross-sectional view illustrating an image forming apparatus and a booklet generation apparatus according to a first embodiment.

A first embodiment of the present invention will be described below with reference to the drawings. The following embodiment is not intended to limit the present invention and may be replaced with another configuration within the spirit of the present invention. An image forming apparatus and a booklet generation apparatus according to the present embodiment will be described below with reference to FIG. 1. FIG. 1 is a schematic diagram illustrating a cross section of an image forming apparatus 1 and a booklet generation apparatus 300 according to the first embodiment. The image forming apparatus 1 and the booklet generation apparatus 300 together form an image forming system 100. The image forming system 100 may include a configuration in which a booklet generation function is partially or entirely embedded in the image forming apparatus 1.

First, the image forming apparatus 1 will be described in detail below. As illustrated in FIG. 1, the image forming apparatus 1 includes a recording material cassette 8, a top sensor 4, an image forming unit 1*e*, a fixing device 6, and a housing 19. The recording material cassette 8 stores recording materials. The top sensor 4 is a unit that detects leading edges of recording materials. The image forming unit 1*e* is an image forming unit. The fixing device 6 is a fixing unit. The housing 19 encloses the recording material cassette 8, the top sensor 4, the image forming unit 1*e*, and the fixing device 6. The image forming apparatus 1 has a printing function to generate a printed material by forming a toner image on a recording material P fed from the recording material cassette 8 using the image forming unit 1*e* and fixing the toner image to the recording material P using the fixing device 6.

According to the present embodiment, a maximum size at which an image can be formed on a recording material P is A4 size (length 297 mm×width 210 mm), and image forming is performed by conveying an A4-sized recording material P in a lengthwise direction.

The recording material cassette 8 is inserted in a lower portion of the image forming apparatus 1 so that the recording material cassette 8 can be pulled out of the housing 19, and a plurality of recording materials P is stored in the recording material cassette 8. The recording material cassette 8 includes a regulating plate (not illustrated), and the regulating plate regulates a recording material width direction (a direction perpendicular to a conveyance direction on a recording material surface) that can be operated by a user. A recording material P stored in the recording material cassette 8 is fed from the recording material cassette 8 by a sheet feed roller 8*a*, which is a sheet feed portion, and conveyed by a pair of conveyance rollers 8*b*. Further, recording materials set on a multi-tray 20 may be fed singly. The top sensor 4 includes a flag for detecting leading edges of recording materials, and a toner image forming start position where the image forming unit 1*e* starts forming a toner image is corrected based on the detection results of the flag.

The image forming unit 1*e* is a tandem type electrophotographic unit including four process cartridges 7*k*, 7*y*, 7*m*, and 7*c*, a scanner unit 2, and a transfer unit 3. A process cartridge refers to a replaceable integrated unit containing a plurality of components for an image forming process. The process cartridges 7*k*, 7*y*, 7*m*, and 7*c* have substantially the same structure, except for the types of powder stored in four powder storage portions Gk, Gy, Gm, and Gc. Specifically, the process cartridges 7*k*, 7*y*, 7*m*, and 7*c* respectively include photosensitive drums Dk, Dy, Dm, and Dc, charging rollers Ck, Cy, Cm, and Cc, and the powder storage portions Gk, Gy, Gm, and Gc. The photosensitive drums Dk, Dy, Dm, and Dc are image bearing members, and the charging rollers Ck, Cy, Cm, and Cc are charging devices. The powder storage portions Gk, Gy, Gm, and Gc store powder and supply the powder to the photosensitive drums Dk, Dy, Dm, and Dc. The four powder storage portions Gk, Gy, Gm, and Gc respectively store black, yellow, magenta, and cyan toners Tk, Ty, Tm, and Tc as toners for forming visible images on recording materials P.

The scanner unit 2 is situated under the process cartridges 7*k*, 7*y*, 7*m*, and 7*c* and above the recording material cassette 8. The scanner unit 2 is an exposure unit according to the present embodiment that irradiates the photosensitive drums Dk, Dy, Dm, and Dc of the process cartridges 7*k*, 7*y*, 7*m*, and 7*c* with laser light and forms electrostatic latent images.

The transfer unit 3 includes a transfer belt 3*a* as an intermediate transfer member (secondary image bearing member). The transfer belt 3*a* is a belt member stretched around an inner secondary transfer roller 3*b* and a tension roller 3*c*, and an outer peripheral surface of the transfer belt 3*a* faces the photosensitive drums Dk, Dy, Dm, and Dc of the process cartridges 7*k*, 7*y*, 7*m*, and 7*c*. On the inner peripheral side of the transfer belt 3*a*, primary transfer rollers Fk, Fy, Fm, and Fc are situated at positions corresponding to the photosensitive drums Dk, Dy, Dm, and Dc. Further, a secondary transfer roller 5 as a transfer unit is situated at a position facing the inner secondary transfer roller 3*b*. A transfer nip 5*n* between the secondary transfer roller 5 and the transfer belt 3*a* is a transfer portion (secondary transfer portion) where toner images are transferred from the transfer belt 3*a* onto a recording material P.

The fixing device 6 is a fixing unit for heating the toner images on the recording material P, melting the toner images, and fixing the toner images and is situated above the secondary transfer roller 5. The fixing device 6 is a fixing device that uses a heat fixing method and includes a heating film 6*b* and a pressing roller 6*c*. The heating film 6*b* is a fixing member that heats using a ceramic heater 6*a* as a heat source, and the pressing roller 6*c* is a pressing member. The heating film 6*b* may heat using a halogen lamp or a heat generation mechanism using an induction heating method. The pressing roller 6*c* is rotated by a drive unit (not illustrated) and is pressed against the heating film 6*b* by a biasing member such as a spring to generate a pressing force to press the recording material P conveyed through a nip portion (fixing nip 6*n*) between the heating film 6*b* and the pressing roller 6*c*. The power input to the ceramic heater 6*a* is controlled by a control unit so that the surface temperature of the heating film 6*b* becomes a predetermined value using a radiation thermometer (not illustrated).

According to the present embodiment, conventional publicly-known toners for printing may be used. Among such toners, toners for printing that use a thermoplastic resin as a binder resin are desirable. Resins that can be used in the thermoplastic resin are not particularly limited, and resins that are used in conventional toners for printing may be used, such as polyester resin, vinyl resin, acrylic resin, or styrene-acrylic resin. More than one of the resins described above may be contained. Among the resins, toners for printing that use styrene-acrylic resin are more desirable. The toners for printing may contain colorants, magnetic materials, charge control agents, waxes, and/or external additives.

In a case where image data to be printed and an instruction to perform printing are input to the image forming apparatus 1, a control unit (not illustrated) of the image forming apparatus 1 starts a series of operations (image forming operation) to convey a recording material P and form an image on the recording material P. In the image forming operation, first, a recording material P is singly fed from the recording material cassette 8 and conveyed along the top sensor 4 via the pair of conveyance rollers 8*b* to the transfer nip 5*n*. While passing along the top sensor 4, the recording material P pushes down the flag of the top sensor 4 in the conveyance direction, and based on this, the control unit detects whether the leading edge of the recording material P has passed, and an image forming start position is determined based on the detection results.

Simultaneously with the feeding of the recording material P, the process cartridges 7*k*, 7*y*, 7*m*, and 7*c* are sequentially driven, and the photosensitive drums Dk, Dy, Dm, and Dc are driven and rotated. At this time, uniform charges are applied to surfaces of the photosensitive drums Dk, Dy, Dm, and Dc by the charging rollers Ck, Cy, Cm, and Cc. Further, the scanner unit 2 irradiates the photosensitive drums Dk, Dy, Dm, and Dc of the process cartridges 7*k*, 7*y*, 7*m*, and 7*c* with laser light modulated based on the image data, and electrostatic latent images are formed on the surfaces of the photosensitive drums Dk, Dy, Dm, and Dc. Next, the electrostatic latent images on the photosensitive drums Dk, Dy, Dm, and Dc are developed into toner images using the powders borne on development rollers Hk, Hy, Hm, and Hc in the powder storage portions Gk, Gy, Gm, and Gc of the process cartridges 7*k*, 7*y*, 7*m*, and 7*c*.

The transfer belt 3*a* rotates anti-clockwise (arrow v) in FIG. 1. Toner images formed by the process cartridges 7*k*, 7*y*, 7*m*, and 7*c* are primarily transferred from the photosensitive drums Dk, Dy, Dm, and Dc onto the transfer belt 3*a* by an electric field formed between the photosensitive drums Dk, Dy, Dm, and Dc and the primary transfer rollers Fk, Fy, Fm, and Fc.

After arriving at the transfer nip 5*n*, the toner images borne on the transfer belt 3*a* are secondarily transferred onto the conveyed recording material P by an electric field formed between the secondary transfer roller 5 and the inner secondary transfer roller 3*b*. Hereinafter, the toner Tk is used to bond recording materials together, and an image after the secondary transfer of the toner Tk to the recording material P will be referred to as "adhesive toner image Ta". The present embodiment is not limited to that described above, and the adhesive toner image Ta may be formed using the toner Ty, Tm, or Tc other than the toner Tk or may be formed by overlaying several of the toners Tk, Ty, Tm, and Tc.

Figure 2A:
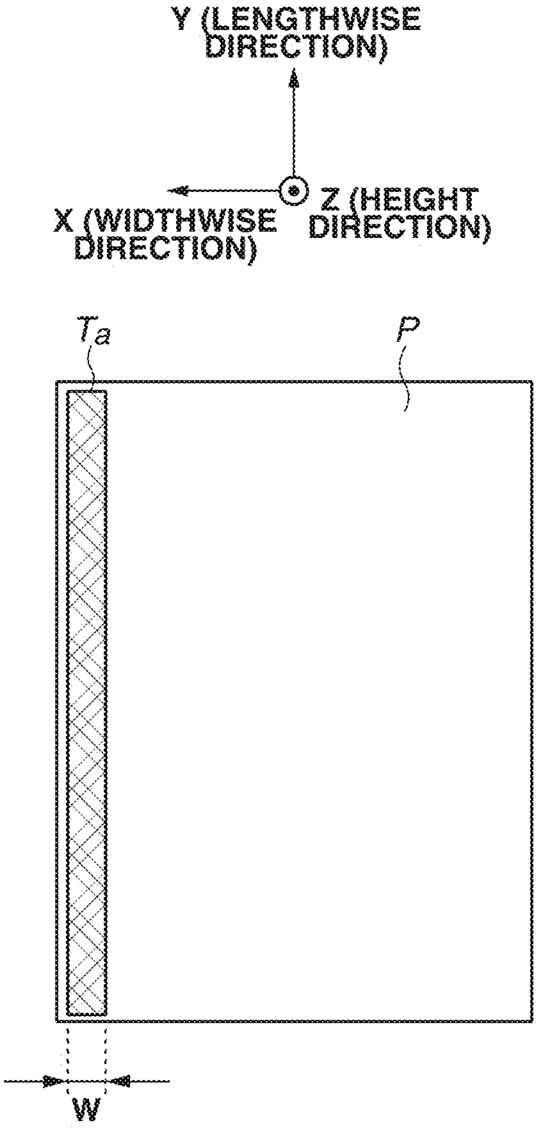
FIGS. 2A to 2B are diagrams illustrating positions of adhesive toner images on recording materials according to the first embodiment.
Figure 2B:
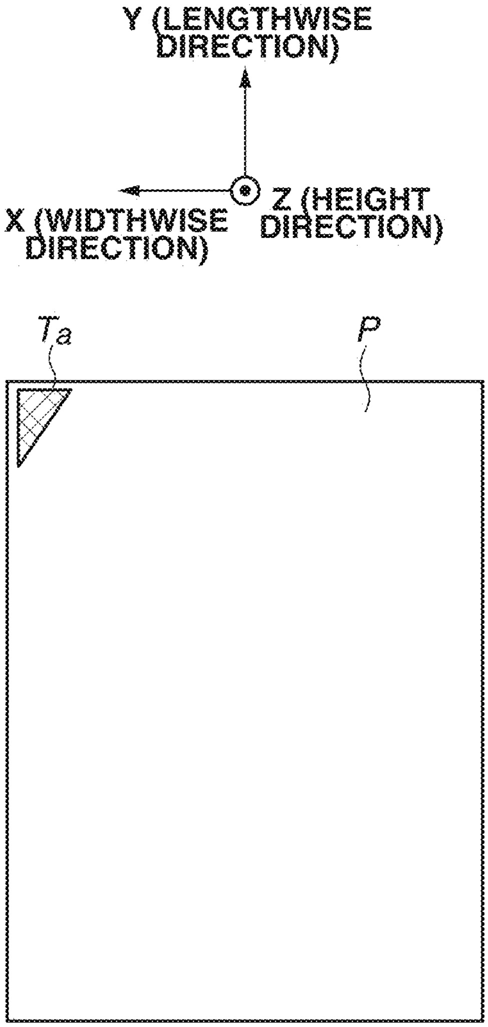

Thereafter, the recording material P is conveyed to the fixing device 6 and undergoes a fixing process. Specifically, while the recording material P passes through the fixing nip 6*n*, the toner images on the recording material P are heated and pressed to cause the toners Ty, Tm, and Tc for printing and the adhesive toner image Ta to melt and thereafter solidify, whereby an image fixed to the recording material P is obtained. FIGS. 2A and 2B illustrate predetermined image regions of the adhesive toner image Ta according to the present embodiment. As illustrated in FIG. 2A, by forming the adhesive toner image Ta (hatched portion) in a lengthwise edge portion of the recording material P, a long-edge bound booklet is generated as an output of the booklet generation by the booklet generation apparatus 300. The adhesive toner image Ta herein has a width W of 4.0 mm. Further, as illustrated in FIG. 2B, by forming the adhesive toner image Ta in a corner portion formed by longer and shorter sides of the recording material P, a corner bound booklet is generated as an output. A form of generating a long-edge bound booklet according to the first embodiment will be described below.

A switching guide 33 is a flap-shaped guide member for switching the conveyance direction based on a selected mode in a case where one of a one-sided printing mode in which an image is formed on one side of a recording material P and a two-sided printing mode in which an image is formed on both sides of a recording material P is selected. In the case of the one-sided printing mode, the switching guide 33 conveys the recording material P to a pair of discharge rollers 34.

On the other hand, in the case of the two-sided printing mode, the switching guide 33 conveys the recording material P to a pair of switchback rollers 35, and after the trailing edge of the recording material P is discharged, the rotation direction of the pair of switchback rollers 35 is reversed to convey the recording material P to a two-sided conveyance path 36 for two-sided printing. The recording material P conveyed to the two-sided conveyance path 36 passes through the secondary transfer portion and the fixing unit again so that an image is formed on an unprinted surface of the recording material P, and the switching guide 33 eventually conveys the recording material P to the pair of discharge rollers 34. The image forming operation of the image forming apparatus 1 has been described above. Operations after the conveyance to the pair of discharge rollers 34 will be described below as an operation of the booklet generation apparatus 300. Further, an operation panel 50 is on the outside of the housing 19 and includes a liquid crystal display unit 50*a*, and the user can view the liquid crystal display unit 50*a* and perform touch operations on the liquid crystal display unit 50*a*. An operating status of the image forming apparatus 1 and a status of consumables such as toners are displayed on the liquid crystal display unit 50*a* of the operation panel 50 by the control unit, and the liquid crystal display unit 50*a* has a navigation function to guide the user through specific operations.

A cross section of the booklet generation apparatus 300 according to the first embodiment and a booklet generation operation to generate a booklet will be described below with reference to FIG. 1. The recording material P having undergone the image forming by the image forming apparatus 1 is conveyed to the booklet generation apparatus 300 via an intermediate conveyance unit 200 including pairs of conveyance rollers 201 and 202. The booklet generation apparatus 300 is a floor standing type and includes a recording material alignment unit and a thermal compression bonding unit 51 in its lower portion. The thermal compression bonding unit 51 is a heating and pressing unit that heats and presses a bundle of aligned recording materials for a predetermined time.

The recording material P conveyed from the intermediate conveyance unit 200 is passed to a pair of conveyance rollers 21 of the booklet generation apparatus 300. Based on a time at which the trailing edge passes through an entrance sensor 27, a pair of conveyance rollers 22 accelerates the recording material P at a predetermined timing. In a case where the recording material P is to be discharged to an upper discharge tray 25, once the trailing edge of the recording material P reaches between the pair of conveyance rollers 22 and reverse rollers 24, the recording material P is decelerated to a predetermined discharge speed and is discharged to the upper discharge tray 25. During the booklet generation process by the thermal compression bonding unit 51, an output destination of the recording material P is a lower discharge tray 37. In this case, a non-return valve 23 biased clockwise by a spring (not illustrated) temporarily stops conveying the recording material P at the timing when the trailing edge of the recording material P exits, and thereafter the non-return valve 23 switches the recording material P back and conveys the recording material P to inner discharge rollers 26. The recording material P conveyed from the inner discharge rollers 26 is conveyed to kick-out rollers 29 via intermediate conveyance rollers 28 and conveyed to an intermediate stacking unit 42. At the bottommost part of the intermediate stacking unit 42, lengthwise alignment reference plates 39 are placed, and the bundle of recording materials P is aligned by pressing end portions of the recording materials P in the conveyance direction against the lengthwise alignment reference plates 39.

Figure 3A:
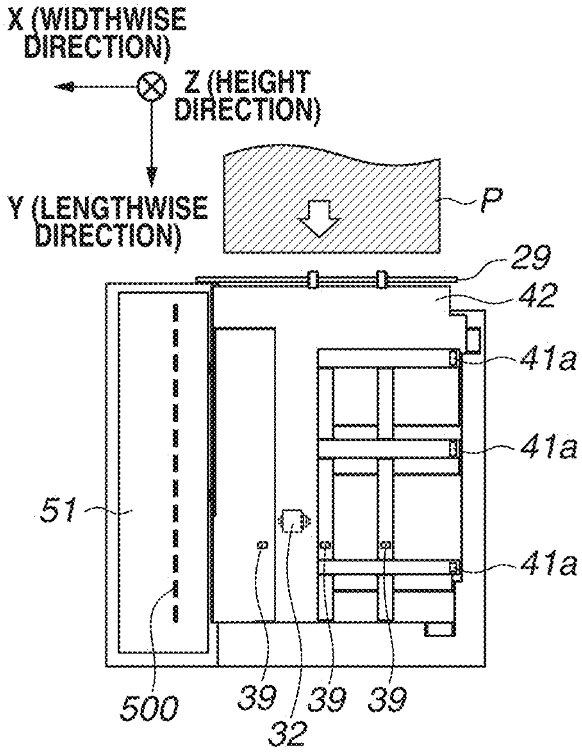
FIGS. 3A to 3D are diagrams illustrating a recording material alignment method of the booklet generation apparatus according to the first embodiment.
Figure 3B:
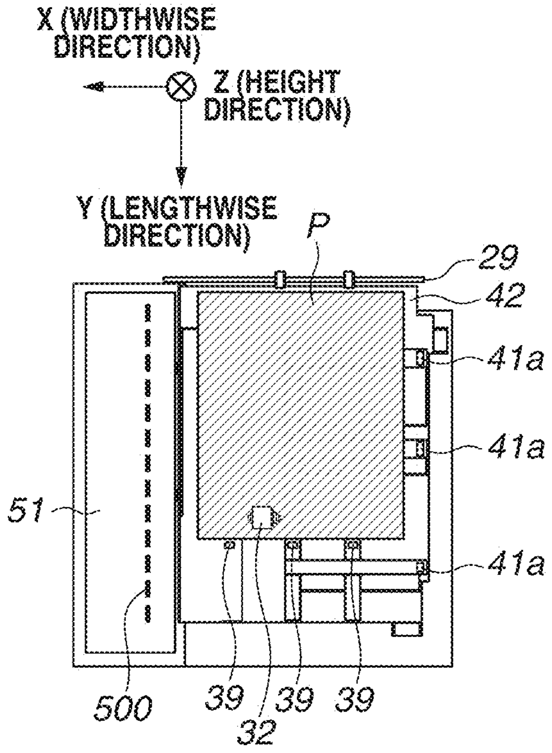
Figure 3C:
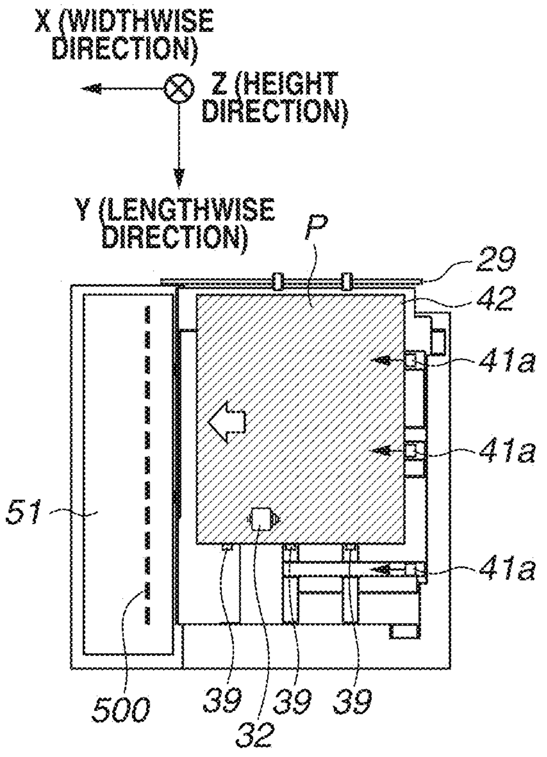
Figure 3D:
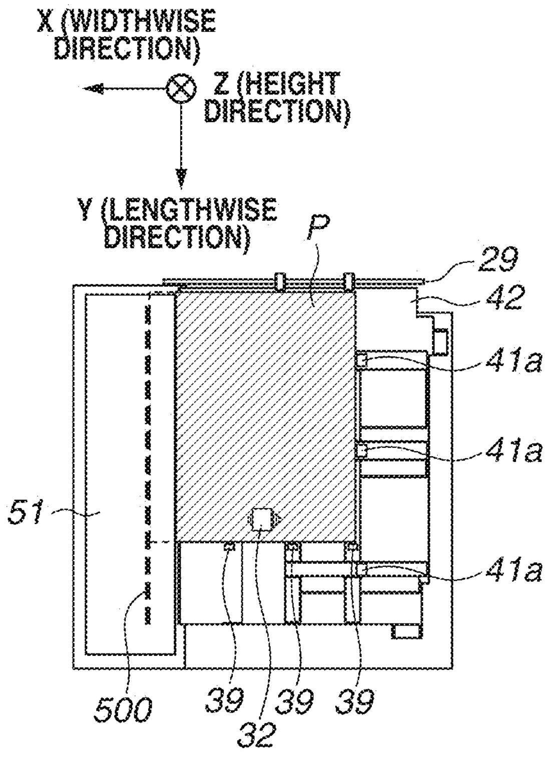

A method of aligning the recording materials P will be described below with reference to FIGS. 3A to 3D. Widthwise, lengthwise, and height directions of the recording materials P will be referred to X, Y, and Z directions, respectively. In FIG. 3A, a semicircular roller (alignment roller) 32 for pushing the recording materials P exited from the kick-out rollers 29 against the lengthwise alignment reference plates 39 is supported to rotate freely in the intermediate stacking unit 42. The semicircular roller 32 conveys the recording materials P to the lengthwise alignment reference plates 39 at a predetermined timing. In FIG. 3B, a conveyance pressure of the semicircular roller 32 is controlled to a particular pressure so that after the recording materials P are pressed against the lengthwise alignment reference plates 39, the semicircular roller 32 slips on the recording material P. Further, a bundle pressing flag 30 for preventing the trailing edge of the recording material P from lifting as illustrated in FIG. 1 is supported downstream of the kick-out rollers 29 to rotate freely so that the trailing edge of the recording material P stacked in the intermediate stacking unit 42 and the leading edge of the subsequent recording material P do not interfere with each other. After the recording materials P reach the lengthwise alignment reference plates 39, an alignment operation is performed until a widthwise alignment jogger 41*a* is pressed against a widthwise alignment reference plate 500 (dashed line) as illustrated in FIG. 3C, and the bundle of recording materials P is aligned at a predetermined position as illustrated in in FIG. 3D. After the alignment of a predetermined number of recording materials P ends, the thermal compression bonding unit 51 as a recording material bonding unit performs a heating and pressing process. The thermal compression bonding unit 51 performs the heating and pressing process on the plurality of recording materials P to generate a bundle of recording materials P. The thermal compression bonding unit 51 performs the heating and pressing process on the bundle of recording materials P aligned in the lengthwise and widthwise directions to thereby generate a bundle of recording materials P (booklet).

Figure 4:
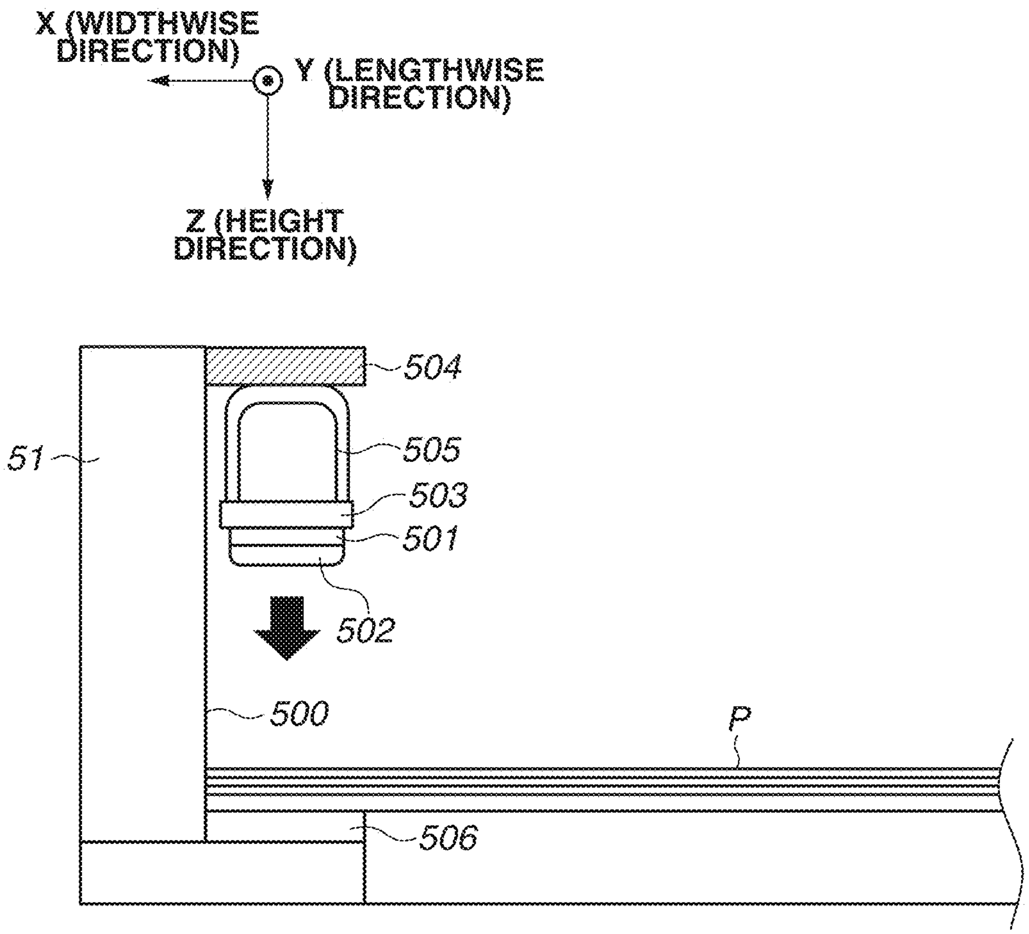
FIG. 4 is a cross-sectional view illustrating a thermal compression bonding unit of the booklet generation apparatus according to the first embodiment.

The structure of the thermal compression bonding unit 51 will be described further below with reference to FIG. 4. FIG. 4 is a cross-sectional view illustrating the thermal compression bonding unit 51. The thermal compression bonding unit 51 places a heating plate 502 in contact with a surface of a ceramic heater 501. The heating plate 502 is made of aluminum and has a thickness of 1.5 mm, and the ceramic heater 501 includes a heat generation member as a heating source and has a thickness of 1.0 mm. The temperature of the ceramic heater 501 is controlled to a target temperature of 240° C. constantly by a temperature detection unit (not illustrated) and a power application unit (not illustrated) supported by a heater support member 503, whereby the surface temperature of the heating plate 502 is controlled to 200° C. Further, the ceramic heater 501 is supported by the heater support member 503 made of resin. A pressing lever 504 obtains power from a drive source (not illustrated) to press the thermal compression bonding unit 51 in the Z direction (downward direction) to apply pressure to the bundle of recording materials P. The pressure from the pressing lever 504 is transmitted to the bundle of recording materials P, for example, at an average surface pressure of 0.2 MPa via a metal stay 505. A pressure range on the bundle of recording materials P is 8.0 mm in the X direction (widthwise direction) and 300 mm in the Y direction (lengthwise direction), and the pressure center is a position of a midpoint of the pressure range in the widthwise direction. A receiving member 506 is a silicone rubber plate with a thickness of 2.0 mm and is a member for stably withstanding the pressure. Further, the pressure applied to the bundle of recording materials P is controlled by controlling a pressing amount of the pressing lever 504. Then, the thermal compression bonding unit 51 presses the bundle of recording materials P for, for example, 2.0 seconds and thereafter separates.

By the foregoing process, the adhesive toner image Ta applied to the recording material P acts as an adhesive through heat melting and solidification to bond the recording materials P together. Further, according to the present embodiment, the adhesive toner image Ta is applied to the recording material P in an amount of about 0.5 $mg/cm^2$, and the adhesive toner image Ta with a specific gravity of about 1.0 $g/cm^3$ is used.

The booklet generation apparatus 300 according to the present embodiment generates a booklet by repeating a process of stacking a plurality of recording materials P, performing the heating and pressing process on the stacked recording materials P, stacking a plurality of recording materials P on the bundle of recording materials P having undergone the heating and pressing process, and performing the heating and pressing process. For example, in a case where five recording materials P are stacked at a time, in order to generate a booklet of 15 recording materials P, the process described above is performed three times in total.

After the binding process of the thermal compression bonding unit 51 is complete, a bundle discharge guide (not illustrated) moves parallel from a stand-by position toward a recording material discharge port 45 to thereby push out the bundle of recording materials P. The recording material discharge port 45 is provided with bundle discharge rollers 38. Once the leading edges of the bundle of recording materials P reach a position slightly beyond the bundle discharge rollers 38, the bundle discharge guide stops and returns to the stand-by position. The bundle discharge rollers 38 discharge the bundle of recording materials P received from the bundle discharge guide to the lower discharge tray 37.

In relation to factors that may worsen the appearance of a booklet, which is the issue of the present application, an example of a mechanism causing misalignment of adhesive toner images formed on recording materials of a booklet will be described below. A case where an adhesive toner image is formed at a position misaligned from a predetermined position on a recording material by the image forming operation as illustrated in FIG. 2A will be described below. The width of the regulating plate of the recording material cassette 8 in the width direction of the recording materials can be changed manually by the user, and there is a suitable regulation position for the size of the recording materials. However, there may be a case where the regulation on the width direction of the recording materials loosens because, for example, the user incorrectly sets the regulating plate at an unsuitable position for the size of recording materials stacked in the recording material cassette 8 or the regulating plate becomes unstable due to manufacturing tolerances. In a case where a recording material is fed from the recording material cassette 8 in the state where the regulation is loose, the recording material may be skewed and conveyed in the skewed state to the image forming portion. In a case where the image forming operation is performed while the recording material remains skewed, an adhesive toner image is formed at a position misaligned from the predetermined position as illustrated in FIG. 2A, and "misalignment of adhesive toner images" occurs.

Further, misalignment of adhesive toner images may occur even in generating, for example, a booklet of a combination of thick paper and thin paper using the multi-tray 20 and the recording material cassette 8. For example, in a case where the recording materials differ in thickness from each other, a small deviation may occur in the timing of pushing down the flag of the top sensor 4. Thus, the image forming start position varies between thick paper and thin paper, and misalignment of adhesive toner images may occur with respect to the conveyance direction in generating a booklet of a combination of thick paper and thin paper. In a case where there is a change in the type of some of the recording materials in the booklet, the user is to input information indicating that a booklet is to be generated using the changed type of recording materials only for front and back covers to the booklet generation apparatus 300, or the type of the recording materials may be identified using a sensor to address the change. Further, it is assumed that one type of recording materials is used in one booklet, and even in a case where different types of recording materials are used for different booklets, the possibility that the deviation in the timing to push down the flag of the top sensor 4 varies for each booklet may be taken into consideration. As described above, in a case where an adhesive toner image is formed at a position misaligned from the predetermined position on a recording material, the adhesive toner images formed on the recording materials of a booklet generated in the booklet generation apparatus 300 become misaligned. When the booklet in which the adhesive toner images on the recording materials are misaligned is viewed from its front cover, the misaligned adhesive toner images inside the booklet are transparently visible from the front cover, which may worsen the appearance of the booklet. Especially in a case where the toners used to form the adhesive toner images Ta include a color toner, the adhesive toner images Ta are often transparently visible and easily recognizable, which often has a negative impact on the booklet quality.

Next, a method for forming an adhesive toner image (image pattern) that is a feature of the present embodiment will be described below with reference to FIGS. 5A to 5C and 6. According to the present embodiment, an adhesive toner image has a rectangular shape and is formed so that the longer side of the rectangular shape is aligned with the longer side of the recording material as illustrated in FIGS. 5A to 5C and 6.

Figure 5A:
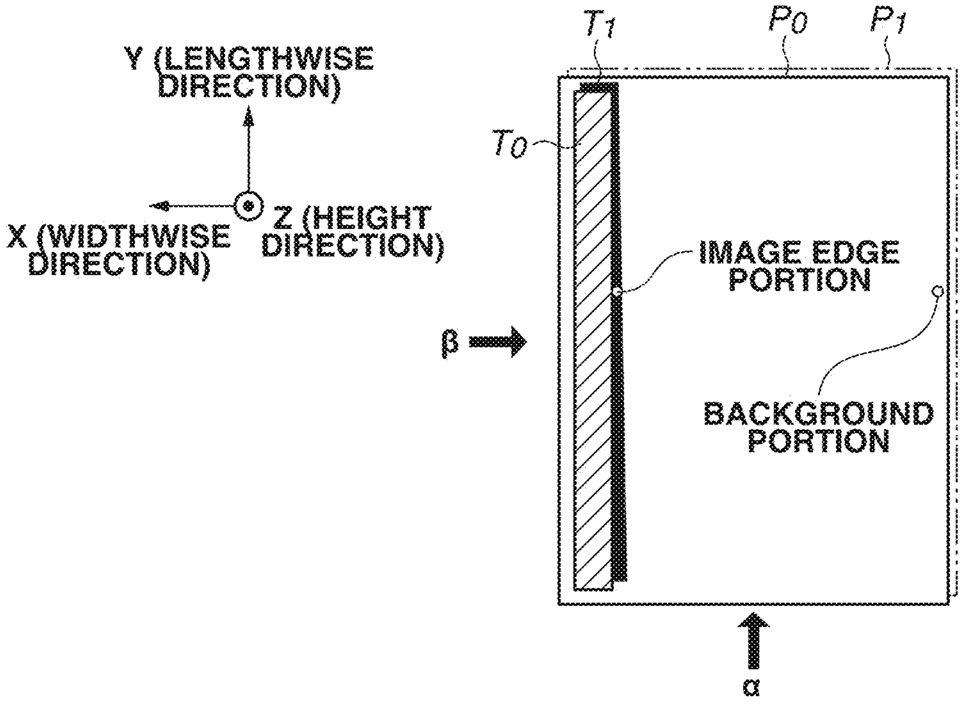
FIGS. 5A to 5C are diagrams illustrating an adhesive toner image pattern of a long-side bound booklet according to a comparative example.
Figure 5B:
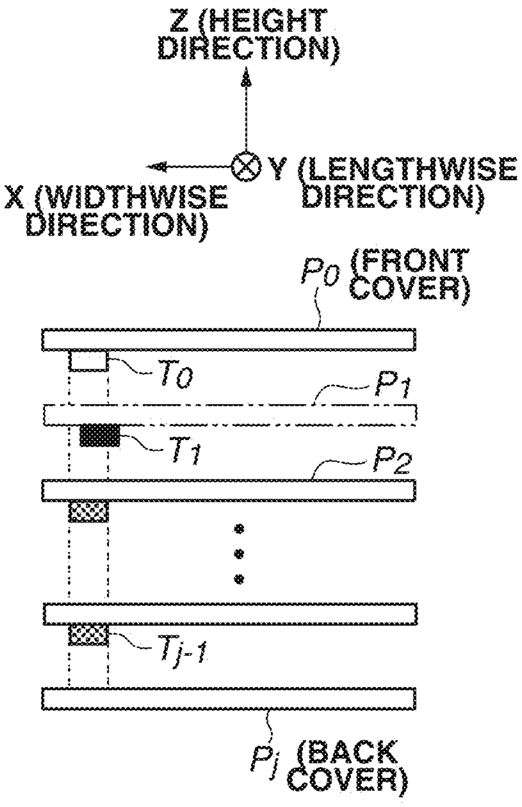
Figure 5C:
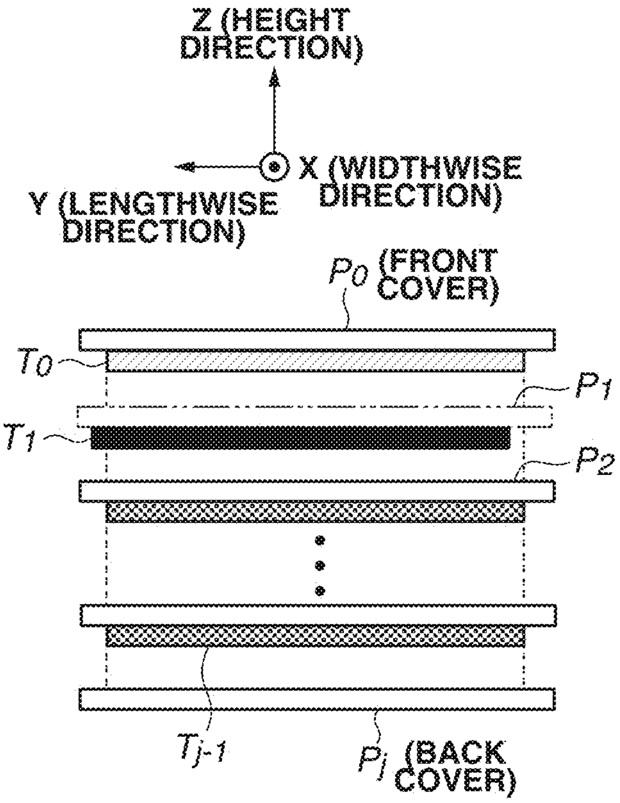

Alternatively, the rectangular shape may be formed so that the longer side of the rectangular shape is aligned with the shorter side of the recording material. FIGS. 5A to 5C illustrate, as a comparative example of the present embodiment, a case where adhesive toner images formed on recording materials have the same size and a booklet is generated with the adhesive toner images misaligned on the recording materials conveyed in a skewed state to the image forming portion.

In FIGS. 5A to 5C, widthwise, lengthwise, and height directions of the booklet will be referred to as X, Y, and Z directions, respectively. A front cover $P_0$ is a front cover of the booklet, a recording material $P_1$ is the first recording material from the front cover of the booklet toward the inside (−Z direction), and a recording material $P_2$ is the next recording material toward the inside of the booklet. Further, a back cover $P_j$ is a back cover of the booklet. The recording materials $P_1$ to $P_{j-1}$ are recording materials sandwiched between the front and back covers of the booklet and will therefore be referred to as middle pages, and according to the present embodiment, there are two or more middle pages. An adhesive toner image $T_0$ is an adhesive toner image for bonding the recording material $P_0$, which is the front cover, and the recording material $P_1$, which is a middle page, together, and an adhesive toner image $T_1$ is an adhesive toner image for bonding the recording materials $P_1$ and $P_2$ together. Further, an adhesive toner image $T_{j-1}$ is an adhesive toner image for bonding the back cover of the booklet. In the comparative example illustrated in FIGS. 5A to 5C, all the adhesive toner images including the adhesive toner images $T_0$ and $T_1$ formed on the recording materials have the same size with a width (X direction) of 4 mm and a length (Y direction) of 287 mm. FIGS. 5A to 5C illustrate a case where the recording material $P_1$ is skewed and only the adhesive toner image $T_1$ formed on the recording material $P_1$ is misaligned, and in FIGS. 5A to 5C, the adhesive toner image $T_1$ is misaligned from the predetermined position by a maximum of 2 mm in the widthwise direction (X direction) and a maximum of 2 mm in the lengthwise direction (Y direction). FIG. 5A is a diagram illustrating the generated booklet viewed from the front cover (Z direction). FIG. 5B is a diagram illustrating the booklet viewed from the bottom of the booklet (α direction in FIG. 5A). FIG. 5C is a diagram illustrating the booklet viewed from the spine of the booklet (β direction in FIG. 5A). As illustrated in FIG. 5A, there is a misalignment of the adhesive toner image $T_0$ for bonding the recording materials $P_0$ and $P_1$ together and the adhesive toner image $T_1$ for bonding the recording materials $P_1$ and $P_2$ together in the booklet from the recording material $P_0$, which is the front cover, to the recording material $P_j$, which is the back cover, generated by the booklet generation apparatus 300. As to specific misalignment directions, as illustrated in FIG. 5B, the adhesive toner image $T_1$ is misaligned from the adhesive toner images $T_0$ and $T_{j-1}$ in the widthwise direction (−X direction). Further, as illustrated in FIG. 5C, the adhesive toner image $T_1$ is misaligned from the adhesive toner images $T_0$ and $T_{j-1}$ also in the lengthwise direction (Y direction). Consequently, the adhesive toner image $T_1$ becomes transparently visible when the adhesive toner image portion is viewed from the front cover of the booklet, which worsens the appearance of the booklet. As described above, in a case where all the adhesive toner images including the adhesive toner images $T_0$ and $T_1$ formed on the recording materials have the same size, an occurrence of a misalignment of the adhesive toner images due to skewing worsens the appearance of the booklet.

Figure 6A:
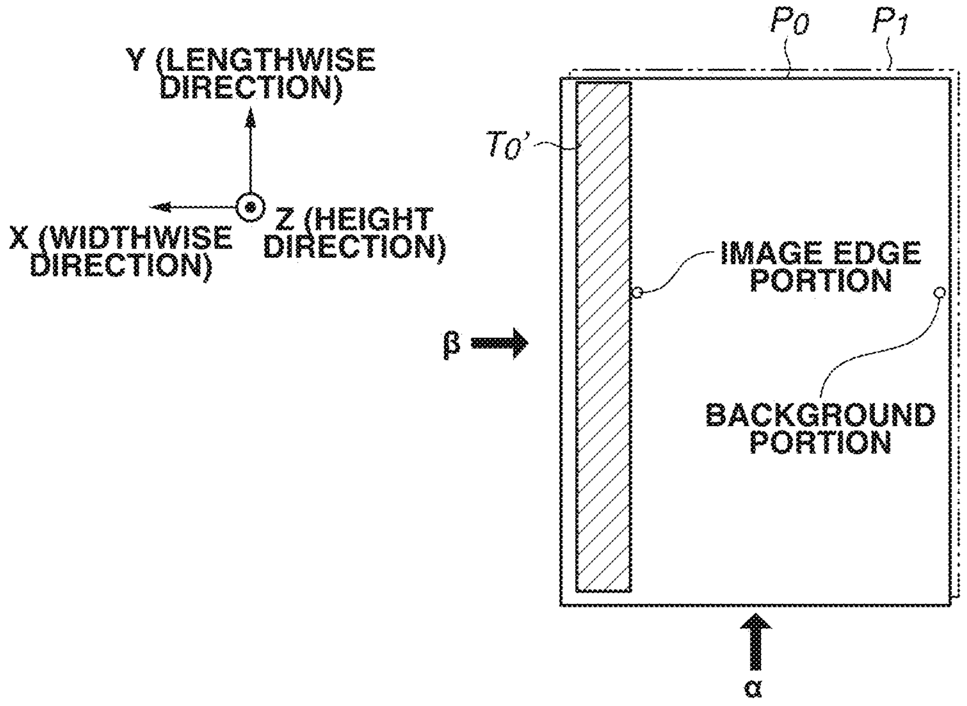
FIGS. 6A to 6C are diagrams illustrating an adhesive toner image pattern according to the first embodiment.
Figure 6B:
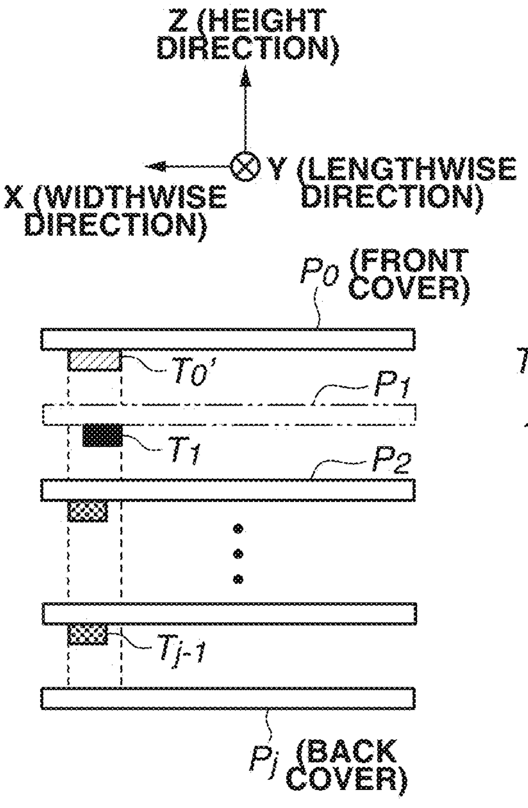
Figure 6C:
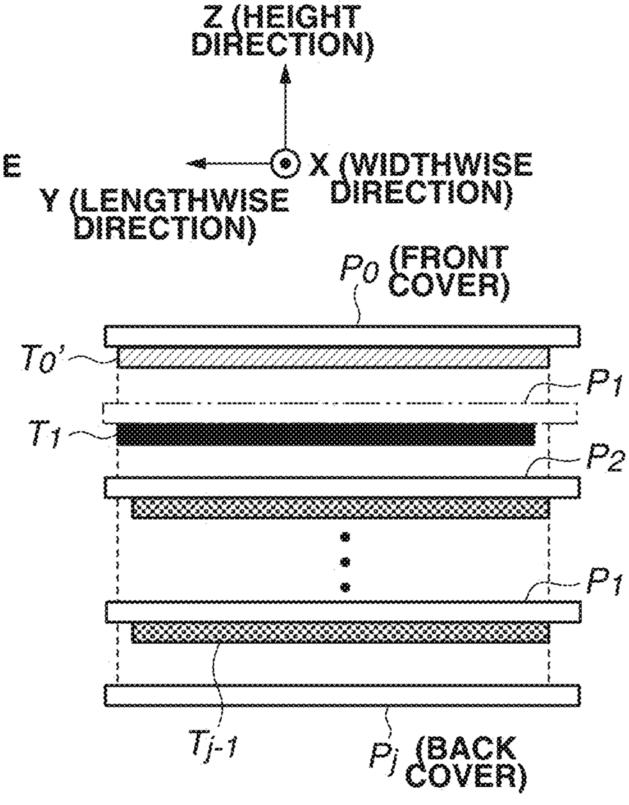

Next, an adhesive toner image pattern according to the present embodiment that does not cause the appearance of the booklet to worsen even in a case where there is a misalignment of adhesive toner images will be described below with reference to FIGS. 6A to 6C. In FIGS. 6A to 6C, widthwise, lengthwise, and height directions of the booklet will be referred to as X, Y, and Z directions, respectively. A front cover $P_0$ is a front cover of the booklet, a recording material $P_1$ is the first recording material from the front cover of the booklet toward the inside (−Z direction), and a recording material $P_2$ is the next recording material toward the inside of the booklet. Further, a back cover $P_j$ is a back cover of the booklet. An adhesive toner image $T_0'$ is an adhesive toner image for bonding the recording material $P_0$, which is the front cover, and the recording material $P_1$, which is a middle page, together, and an adhesive toner image $T_1$ is an adhesive toner image for bonding the recording materials $P_1$ and $P_2$ together. Further, an adhesive toner image $T_{j-1}$ is an adhesive toner image for bonding the back cover of the booklet. FIGS. 6A to 6C illustrate a case where the recording material $P_1$ is skewed and only the adhesive toner image $T_1$ formed on the recording material $P_1$ is misaligned as in the comparative example illustrated in FIGS. 5A to 5C.

In FIGS. 6A to 6C, the adhesive toner image $T_1$ is also misaligned from the predetermined position by a maximum of 2 mm in the widthwise direction (X direction) and a maximum of 2 mm in the lengthwise direction (Y direction). FIG. 6A is a diagram illustrating the generated booklet viewed from the front cover (Z direction). FIG. 6B is a diagram illustrating the booklet viewed from the bottom of the booklet (a direction in FIG. 6A). FIG. 6C is a diagram illustrating the booklet viewed from the spine of the booklet (β direction in FIG. 6A).

A feature of the present embodiment is that even in a case where there is a misalignment of the adhesive toner images, in order to maintain the appearance of the booklet, the adhesive toner image $T_0'$ for bonding the front cover and the middle page together is formed to be greater in size than the adhesive toner images ($T_1$ to $T_{j-1}$) for bonding the middle pages together. The adhesive toner image $T_0'$ according to the present embodiment has a width (X direction) of 6 mm and a length (Y direction) of 289 mm. The width and the length are greater than the width (X direction), which is 4 mm, and the length (Y direction), which is 287 mm, of the adhesive toner images ($T_1$ to $T_{j-1}$) formed on the recording materials other than the front cover of the booklet. Specifically, the adhesive toner image $T_0'$ is greater in area than the adhesive toner images ($T_1$ to $T_{j-1}$) when viewed from the direction perpendicular to the surfaces of the recording materials.

A relationship in the widthwise direction (X direction), the lengthwise direction (Y direction), and the height direction (Z direction) of the adhesive toner image regions formed on the recording materials of the booklet will be described below. As illustrated in FIG. 6B, the adhesive toner image $T_0'$ is formed to be longer in the widthwise direction (−X direction) than the adhesive toner images ($T_1$ to $T_{j-1}$). Further, as illustrated in FIG. 6C, the adhesive toner image $T_0'$ is formed to be longer in the lengthwise direction (Y direction) than the adhesive toner images ($T_1$ to $T_{j-1}$). Consequently, as illustrated in FIG. 6A, the adhesive toner image $T_1$ is not transparently visible although the adhesive toner images on the recording materials for bonding the middle pages together are misaligned when viewed from the front cover. The adhesive toner image for bonding the front cover and the middle page together is formed to be greater in area than the adhesive toner images for bonding the middle pages together so that even in a case where an adhesive toner image formed in the booklet is misaligned from the adhesive toner image on the front cover, the misaligned adhesive toner image is not transparently visible from the front cover, which prevents the appearance of the booklet from worsening. This is because the booklet is generated so that the adhesive toner image portions for bonding the middle pages together are entirely covered by the adhesive toner image for bonding the front cover and the middle page together when the booklet is viewed from the front cover.

Desirably, the size of the adhesive toner image $T_0'$ for bonding the front cover is determined considering a maximum value of an amount of misalignment of images that may occurs in the image forming apparatus 1. Specifically, the adhesive toner image $T_0'$ is desirably large enough to cover even the maximum misalignment of images. However, from the point of view of the adhesive toner consumption, the adhesive toner image $T_0'$ is desirably set to the smallest possible area that still covers the entire region where misalignment of adhesive toner images may occur. Not only the area of the adhesive toner image for bonding the front cover and the middle page together but also the area of the adhesive toner image for bonding the back cover and the middle page together may be increased, or both the area of the adhesive toner image for bonding the front cover and the middle page together and the area of the adhesive toner image for bonding the back cover and the middle page together may be increased.

While the adhesive toner image on the front cover of the booklet is increased in length in both the lengthwise and widthwise directions of the booklet according to the present embodiment, the image may be enlarged only in the lengthwise direction of the booklet or only in the widthwise direction of the booklet. For example, in a case where there is a tendency for the recording materials to become skewed in a particular direction, a misalignment of the adhesive toner images is likely to occur in the skew direction, so that it is desirable to select a direction for increasing the length of the adhesive toner images based on the tendency. Further, in a case where recording materials having a different thickness from each other are used to generate a booklet, the timing to push down the flag of the top sensor 4 may vary slightly due to the difference in thickness between the recording materials, and this changes the image forming start position of the adhesive toner images in the lengthwise direction, so that only the length in the lengthwise direction of the recording materials may be increased. Thus, even in a case where the adhesive toner images for bonding the middle pages together are misaligned in both the lengthwise direction and the widthwise direction from the adhesive toner image for bonding the front cover and the middle page together, the adhesive toner images are prevented from becoming transparently visible by increasing only in the lengthwise direction or only in the widthwise direction, so that the appearance is expected to improve.

There are other possible mechanisms causing misalignment of adhesive toner images besides the above-described mechanism according to the present embodiment. For example, the booklet generation apparatus 300 may fail to align recording materials properly in generating a booklet. In the booklet generation apparatus 300 illustrated in FIGS. 3A to 3D, the widthwise alignment jogger 41*a* presses the recording materials against the widthwise alignment reference plate 500 for the alignment in the X direction (widthwise direction), so that the recording materials are less likely to be misaligned in the X direction. On the other hand, the alignment of the recording materials in the Y direction (lengthwise direction) is performed by pressing the recording materials against the lengthwise alignment reference plates 39 using the semicircular roller 32. The frictional force between the semicircular roller 32 and a recording material varies depending on a toner image pattern formed on a portion of the recording material that is in contact with the semicircular roller 32 and pressed by the semicircular roller 32 and a printing rate of the portion. Thus, the pressing force from the recording material against lengthwise alignment reference plates 39 also varies, and this may make it difficult for the recording material to be aligned with the lengthwise alignment reference plates 39. In a case where the recording materials undergoes the binding process of the thermal compression bonding unit 51 without being properly aligned, the adhesive toner images on the recording materials of the booklet may be misaligned, and the adhesive toner images for bonding the middle pages together may become visible, which worsens the appearance.

In this case, it is desirable to increase the length of the adhesive toner images only in the direction that is aligned with the semicircular roller 32. As described above, it is desirable to select a direction for increasing the length of the adhesive toner image $T_0'$ on the front cover of the booklet based on the toner image pattern formed on the recording material and the printing rate. Specifically, it is desirable to change the shape and/or size of the adhesive toner images.

The extent of skew of recording materials in the image forming apparatus 1 and the extent of misalignment of recording materials in the booklet generation apparatus 300 as described above vary depending on physical property values of the recording materials, such as thickness, surface properties, and moisture content (paper stiffness). Specifically, the direction in which a misalignment of adhesive toner images occurs and the misalignment amount vary depending on the types of recording materials used to generate a booklet and an operating environment (such as temperature and humidity). Examples regarding the thickness and surface properties are as described above. Regarding the moisture content, for example, thin paper and plain paper with high moisture content are easily curled in the width direction, and this often makes the alignment in the widthwise direction difficult, so that it is desirable to increase the length of the adhesive toner image $T_0$' in the width direction. To measure the operating environment (such as temperature and humidity) of the booklet generation apparatus 300, sensors for the measurement are installed in the booklet generation apparatus 300 or in the image forming apparatus 1 connected to the booklet generation apparatus 300. Desirably, directions in which misalignment of adhesive toner images tends to occur and misalignment amounts are identified in advance for each type of recording materials and for each operating environment of the booklet generation apparatus 300, and the shape and size of the adhesive toner image $T_0$' on the front cover of the booklet are changed based on booklet generation conditions (types of recording materials, operating environment). Specifically, the adhesive toner image $T_0$' on the front cover is set to the smallest possible area that still covers the entire region where misalignment of adhesive toner images may occur for each booklet generation condition (types of recording materials, operating environment). For example, in a booklet generation condition in which misalignment of adhesive toner images is small, the adhesive toner image $T_0$' on the front cover may be set to be smaller than the region (6 mm×289 mm) according to the present embodiment described above. By changing the shape and size of the adhesive toner image $T_0$' on the front cover of the booklet for each booklet generation condition (types of recording materials, operating environment) so that the adhesive toner image $T_0$' is set to a minimum required area for the booklet generation condition, the appearance of the booklet is prevented from worsening while reducing the adhesive toner consumption.

Next, evaluation experiments conducted to check effects of the present embodiment will be described below. Effects of increasing the area of an adhesive toner image for bonding a front cover of a booklet to be greater than the area of adhesive toner images for bonding middle pages together will be evaluated. In the evaluation experiments, the present embodiment in which the area of the adhesive toner image $T_0$' for bonding the front cover is increased as illustrated in FIG. 6A and the comparative example in which all the adhesive toner images formed on the recording materials have the same area as illustrated in FIG. 5A are compared. In each of FIGS. 5A to 5C and 6A to 6C, the adhesive toner image $T_1$ is misaligned from the predetermined position by a maximum of 2 mm in the widthwise direction (−X direction) and a maximum of 2 mm in the lengthwise direction (Y direction).

In the evaluation experiments on the present embodiment, a booklet was generated using a CS-060F (manufactured by Canon) as recording materials, and misalignment of adhesive toner images transparently visible from a front cover was evaluated by measuring densities of toners transparently visible from the front cover. As to evaluation conditions, a booklet of the comparative example was placed on 10 sheets of GFC081 (manufactured by Canon) placed on top of another on a horizontal flat surface, and a booklet of the present embodiment was placed on other 10 sheets of GFC081 (manufactured by Canon) placed on top of another on a horizontal flat surface. Then, densities of adhesive toner images at image edge portions and densities of backgrounds of the recording materials were measured from the front covers (−Z direction) of the booklets using a digital microscope (PIAS®-II manufactured by QEA). The 10 sheets of GFC081 (manufactured by Canon) were placed on top of another to eliminate the influence of densities of backgrounds other than the measurement samples. In the evaluation experiments, standard set conditions for wavelength range in density are a status T.

The image edge portion according to the present embodiment refers to a position misaligned by 1 mm in the widthwise direction (−X direction) from an edge of the adhesive toner image $T_0$ bonding the front cover of the booklet as illustrated in FIG. 5A. The background portion according to the present embodiment refers to a region without an adhesive toner image or a toner image for printing, such as a margin portion, as illustrated in FIG. 5A. The image edge portion and the background portion in FIG. 6A were measured under the same conditions.

Table 1 presents measurement results of densities of the image edge portions and the background portions of the booklets of the comparative example and the present embodiment and calculation results of differences between the densities of the image edge portions and the background portions.

TABLE 1

Comparison of Densities between Present Embodiment and Comparative Example

| | Comparative Example | Present Embodiment |
|---|---|---|
| Density of Image Edge Portion | 0.14 | 0.07 |
| Density of Background Portion | 0.07 | 0.07 |
| Difference in Density | 0.07 | 0.00 |

As described above, in the comparative example in which all the adhesive toner images formed on the recording materials have the same size, the density of the image edge portion is 0.14, and the density of the background is 0.07. Therefore, the difference in density between the adhesive toner image edge portion and the background is 0.07. The presence of the difference in density indicates that an adhesive toner image bonding middle pages together is transparently visible, and the adhesive toner image $T_1$ of the booklet of the comparative example is transparently visible when viewed from the front cover, which worsens the appearance of the booklet.

On the other hand, in the present embodiment in which the area of the adhesive toner image $T_0$' bonding the front cover is increased, the density of the image edge portion is 0.07, and the density of the background is 0.07. Therefore, the difference in density between the adhesive toner image edge portion and the background is 0.00. The absence of the difference in density indicates that the adhesive toner images bonding the middle pages together are not transparently visible.

As described above, according to the present embodiment, the area of the adhesive toner image for bonding the front cover of the booklet is increased so that even in a case where misalignment of the adhesive toner images occurs, the adhesive toner images bonding the middle pages together are not visible from the front cover, which prevents the appearance of the booklet from worsening. In a case where the number of recording materials in the booklet increases or the recording materials increase in thickness or white level, misalignment of the adhesive toner images in the booklet becomes less visible.

Since the feature of the present embodiment is that misalignment of adhesive toner images is prevented from becoming transparently visible from the front cover, the adhesive toner image for bonding the front cover is to have the greatest size among the adhesive toner images in a visible range (on the visible recording materials). Thus, patterns and sizes of adhesive toner images in the booklet that are outside the visible range from the front or back cover are not particularly limited. The visible range herein refers to, for example, a case where the difference in density is 0.01 or higher in a case where there is a misalignment of adhesive toner images. Specifically, in a case where the recording materials are thick or high in white level, the visible range often becomes small (the number of visible recording materials decreases).

Further, as another effect, if the area of the adhesive toner for bonding the front cover and the middle page together is increased, the adhesive toner is present also in portions near edges of end portions of longer and shorter sides of the recording materials, which prevents the end portions of the longer and shorter sides of the front cover from lifting. Similar effects are also produced with respect to the back cover.

Next, a second embodiment of the present invention will be described below. Descriptions of those that are similar to the first embodiment will be omitted below. The second embodiment is intended to generate a corner bound booklet, and a form with adhesive toner image shapes different from those according to the first embodiment will be described below. An adhesive toner image forming method (image pattern) that is a feature of the present embodiment will be described below with reference to FIGS. 7A to 7C and 8A to 8C. According to the present embodiment, as illustrated in FIGS. 7A to 7C and 8A to 8C, adhesive toner images are triangular-shaped and formed in corner portions formed by the longer and shorter sides of the recording materials.

Figure 7A:
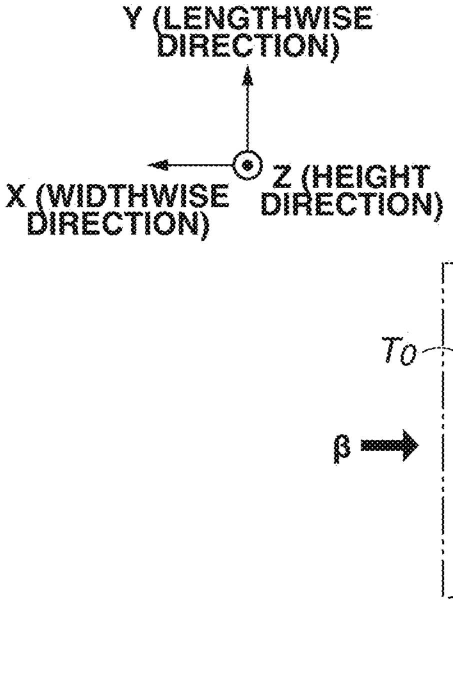
FIGS. 7A to 7C are diagrams illustrating an adhesive toner image pattern of a corner bound booklet according to a comparative example.
Figure 7B:
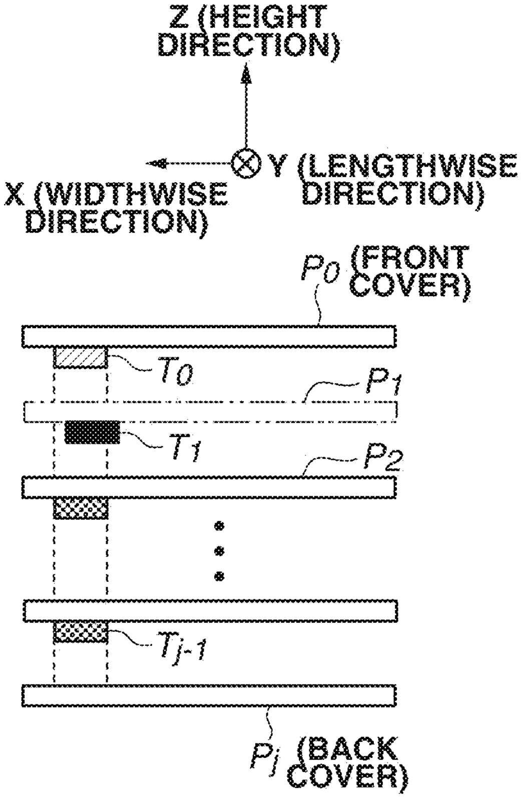
Figure 7C:
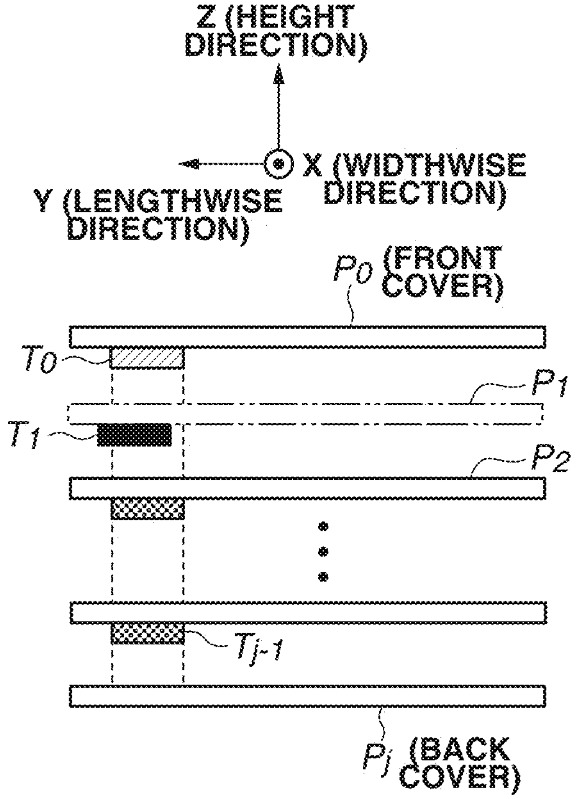

FIGS. 7A to 7C illustrate, as a comparative example, a case where a recording material is skewed and conveyed to the image forming portion and a booklet in which adhesive toner images are misaligned is generated. In FIGS. 7A to 7C, widthwise, lengthwise, and height directions of the booklet will be referred to as X, Y, and Z directions, respectively. A front cover $P_0$ is a front cover of the booklet, a recording material $P_1$ is the first recording material from the front cover of the booklet toward the inside (−Z direction), and a recording material $P_2$ is the next recording material toward the inside of the booklet. Further, a back cover $P_j$ is a back cover of the booklet. An adhesive toner image $T_0$ is an adhesive toner image for bonding the recording material $P_0$, which is the front cover, and the recording material $P_1$, which is a middle page, together, and an adhesive toner image $T_1$ is an adhesive toner image for bonding the recording materials $P_1$ and $P_2$ together. Further, an adhesive toner image $T_{j-1}$ is an adhesive toner image for bonding the back cover of the booklet. In the comparative example illustrated in FIGS. 7A to 7C, all the adhesive toner images including the adhesive toner images $T_0$ and $T_1$ formed on the recording materials have the same right triangular shape with a side (length 6 mm) parallel to the X direction and a side (length 12 mm) parallel to the Y direction. FIGS. 7A to 7C illustrate a case where the recording material $P_1$ is skewed and only the adhesive toner image $T_1$ formed on the recording material $P_1$ is misaligned, and in FIGS. 7A to 7C, the adhesive toner image $T_1$ is misaligned from the predetermined position by a maximum of 2 mm in the widthwise direction (X direction) and a maximum of 2 mm in the lengthwise direction (Y direction). FIG. 7A is a diagram illustrating the generated booklet viewed from the front cover (Z direction). FIG. 7B is a diagram illustrating the booklet viewed from the bottom of the booklet (a direction in FIG. 7A). FIG. 7C is a diagram illustrating the booklet viewed from the spine of the booklet (direction in FIG. 7A). As illustrated in FIG. 7A, there is a misalignment of the adhesive toner image $T_0$ for bonding the recording materials $P_0$ and $P_1$ together and the adhesive toner image $T_1$ for bonding the recording materials $P_1$ and $P_2$ together in the booklet from the recording material $P_0$, which is the front cover, to the recording material $P_j$, which is the back cover, generated by the booklet generation apparatus 300. As illustrated in FIG. 7B, the adhesive toner image $T_1$ is misaligned from the adhesive toner images $T_0$ and $T_{j-1}$ in the widthwise direction (−X direction). Further, as illustrated in FIG. 7C, the adhesive toner image $T_1$ is misaligned from the adhesive toner images $T_0$ and $T_{j-1}$ also in the lengthwise direction (Y direction). Consequently, the adhesive toner image $T_1$ becomes transparently visible when the adhesive toner image portion is viewed from the front cover of the booklet, which worsens the appearance of the booklet. As described above, in a case where all the adhesive toner images including the adhesive toner images $T_0$ and $T_1$ formed on the recording materials have the same size, an occurrence of a misalignment of the adhesive toner images due to skewing worsens the appearance of the booklet.

Figure 8A:
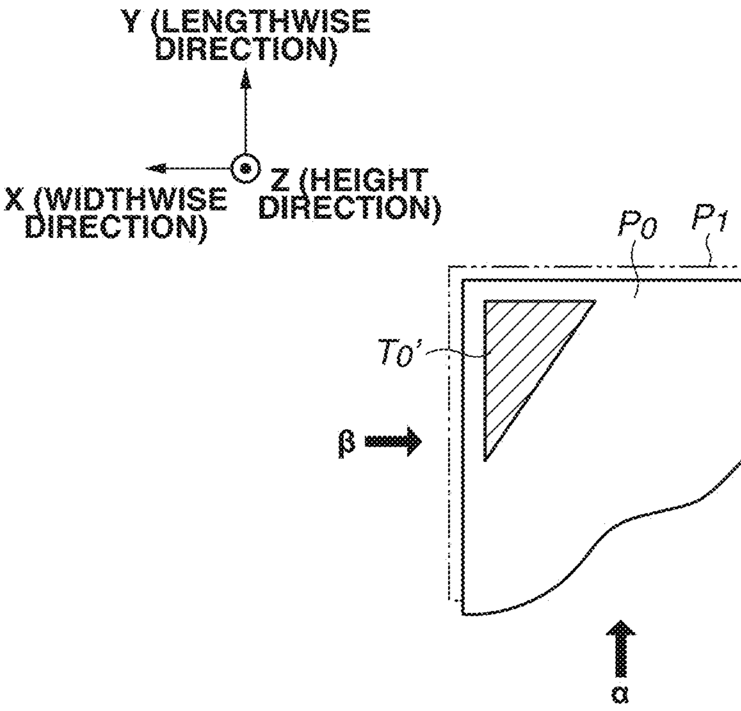
FIGS. 8A to 8C are diagrams illustrating an adhesive toner image pattern according to a second embodiment.
Figure 8B:
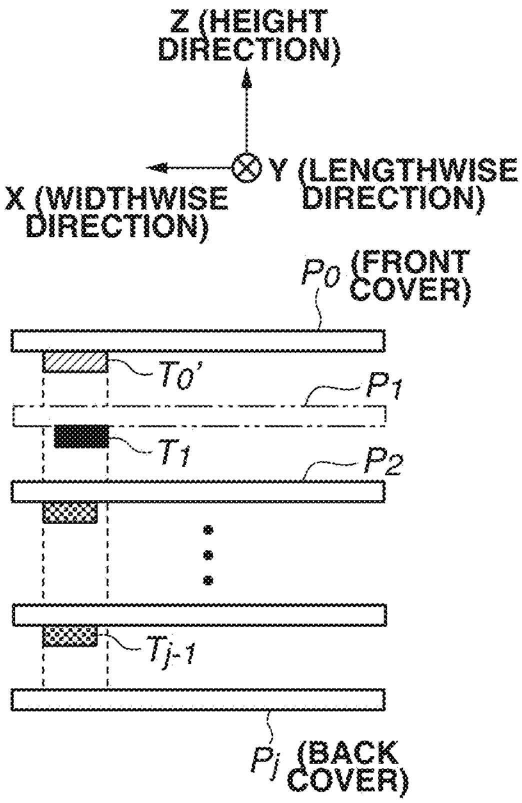
Figure 8C:
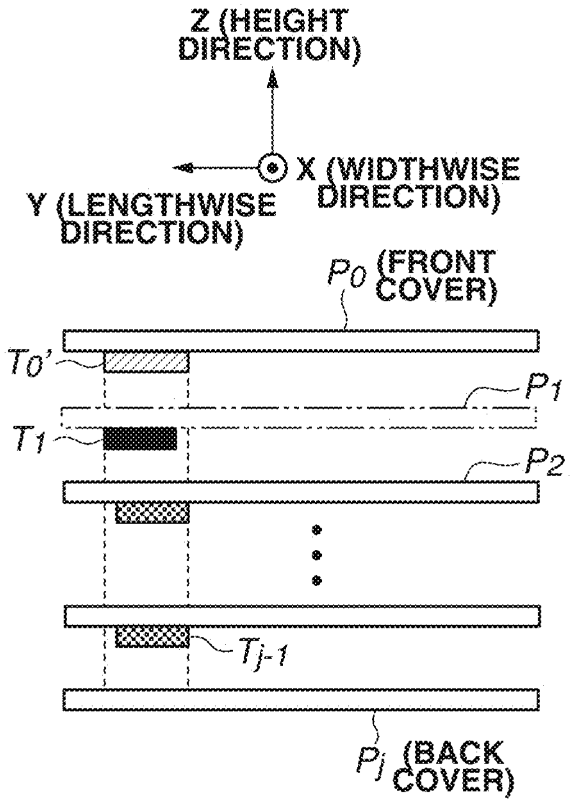

Next, an adhesive toner image pattern according to the present embodiment that does not cause the appearance of the booklet to worsen even in a case where there is a misalignment of adhesive toner images will be described below with reference to FIGS. 8A to 8C. In FIGS. 8A to 8C, widthwise, lengthwise, and height directions of the booklet will be referred to as X, Y, and Z directions, respectively. A front cover $P_0$ is a front cover of the booklet, a recording material $P_1$ is the first recording material from the front cover of the booklet toward the inside (−Z direction), and a recording material $P_2$ is the next recording material toward the inside of the booklet. Further, a back cover $P_j$ is a back cover of the booklet. An adhesive toner image $T_0'$ is an adhesive toner image for bonding the recording material $P_0$, which is the front cover, and the recording material $P_1$, which is a middle page, together, and an adhesive toner image $T_1$ is an adhesive toner image for bonding the recording materials $P_1$ and $P_2$ together. Further, an adhesive toner image $T_{j-1}$ is an adhesive toner image for bonding the back cover of the booklet. FIGS. 8A to 8C illustrate a case where the recording material $P_1$ is skewed and only the adhesive toner image $T_1$ formed on the recording material $P_1$ is misaligned as in the comparative example illustrated in FIGS. 7A to 7C.

In FIGS. 8A to 8C, the adhesive toner image $T_1$ is also misaligned from the predetermined position by a maximum of 2 mm in the widthwise direction (X direction) and a maximum of 2 mm in the lengthwise direction (Y direction). FIG. 8A is a diagram illustrating the generated booklet viewed from the front cover (Z direction). FIG. 8B is a diagram illustrating the booklet viewed from the bottom of the booklet (a direction in FIG. 8A). FIG. 8C is a diagram illustrating the booklet viewed from the spine of the booklet (direction in FIG. 8A). A feature of the present embodiment is that even in a case where there is a misalignment of the adhesive toner images, in order to maintain the appearance of the booklet, the adhesive toner image $T_0'$ for bonding the front cover and the middle page together is formed to be greater in size than the adhesive toner images ($T_1$ to $T_{j-1}$) for bonding the middle pages together. The adhesive toner image $T_0'$ according to the present embodiment is formed in the shape of a right triangle with a side (length 8 mm) parallel to the X direction and a side (length 14 mm) parallel to the Y direction. The adhesive toner images ($T_1$ to $T_{j-1}$) formed on the recording materials that are middle pages are each in the shape of a right triangle with a side (length 6 mm) parallel to the X direction and a side (length 12 mm) parallel to the Y direction.

A relationship in the widthwise direction (X direction), the lengthwise direction (Y direction), and the height direction (Z direction) of the adhesive toner image regions formed on the recording materials of the booklet will be described below. As illustrated in FIG. 8B, the adhesive toner image $T_0'$ is formed to be longer in the widthwise direction (−X direction) than the adhesive toner images ($T_1$ to $T_{j-1}$). Further, as illustrated in FIG. 8C, the adhesive toner image $T_0'$ is formed to be longer in the lengthwise direction (Y direction) than the adhesive toner images ($T_1$ to $T_{j-1}$). Consequently, as illustrated in FIG. 8A, the formed adhesive toner image $T_1$ misaligned from the predetermined position is not transparently visible when viewed from the front cover. As described above, by increasing the area of the adhesive toner image for bonding the front cover of the booklet, misalignment of adhesive toner images in the booklet becomes invisible from the front cover, which prevents the appearance of the booklet from worsening.

Desirably, the size of the adhesive toner image $T_0'$ for bonding the front cover is determined considering a maximum value of an amount of misalignment of images that may occurs in the image forming apparatus 1. Specifically, the adhesive toner image $T_0'$ is desirably large enough to cover even the maximum misalignment of images. The recording material where the area of the adhesive toner image is to be increased to be greater than the area of the adhesive toner images for bonding the middle pages together is not limited to the front cover only and may be the back cover only or may be both the front and back covers. While the adhesive toner image on the front cover of the booklet is increased in length in both the lengthwise and widthwise directions of the booklet according to the present embodiment, the image may be increased in length only in the lengthwise direction of the booklet or only in the widthwise direction of the booklet. Further, the shape and size of at least one of the adhesive toner images on the front and back covers of the booklet may be changed based on the types of the recording materials and the operating environment. Desirably, the adhesive toner image for bonding at least one of the front and back covers of the booklet is greater in area than the adhesive toner images for bonding the middle pages together among the adhesive toner images in the visible range (on the visible recording materials).

Figure 9A:
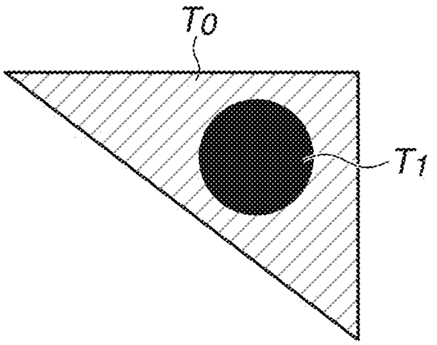
FIGS. 9A to 9D are diagrams illustrating adhesive toner images according to a modified example of the second embodiment.
Figure 9B:
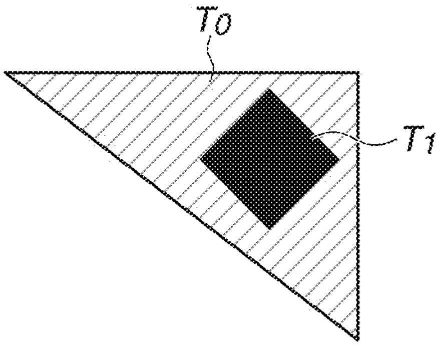
Figure 9C:
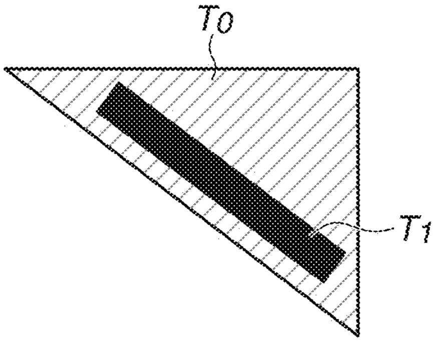
Figure 9D:
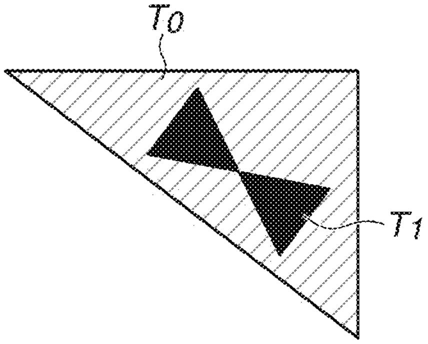

While all the adhesive toner image patterns for bonding the booklet on the recording materials have the same triangular shape according to the present embodiment, this is not a limiting shape. For example, adhesive toner image patterns illustrated in FIGS. 9A to 9D also fall under the present embodiment. An example that prevents the appearance of a booklet from worsening due to misalignment of adhesive toner images on recording materials of the booklet in a case where the adhesive toner images differ from each other will be described below with reference to FIGS. 9A to 9D. As illustrated in FIGS. 9A to 9D, an adhesive toner image $T_0$ for bonding a front or back cover is greater in area than an adhesive toner image $T_1$ for bonding middle pages. In FIG. 9A, the adhesive toner image $T_0$ is triangular, while the adhesive toner image $T_1$ is circular. In FIG. 9B, the adhesive toner image $T_0$ is triangular, while the adhesive toner image $T_1$ is diamond-shaped. In FIG. 9C, the adhesive toner image $T_0$ is triangular, while the adhesive toner image $T_1$ is rectangular. In FIG. 9D, the adhesive toner image $T_0$ is triangular, while the adhesive toner image $T_1$ is butterfly-shaped. As described above, the adhesive toner image for bonding at least one of the front and back covers of the booklet and the adhesive toner images for bonding the middle pages together may be in any shape as long as the former is greater in size than the latter.

Next, a third embodiment of the present invention will be described below. Descriptions that are similar to those of the first or second embodiment will be omitted below. The third embodiment is intended to generate a corner bound booklet, and a form with adhesive toner image shapes different from those according to the second embodiment will be described below.

Figure 10:
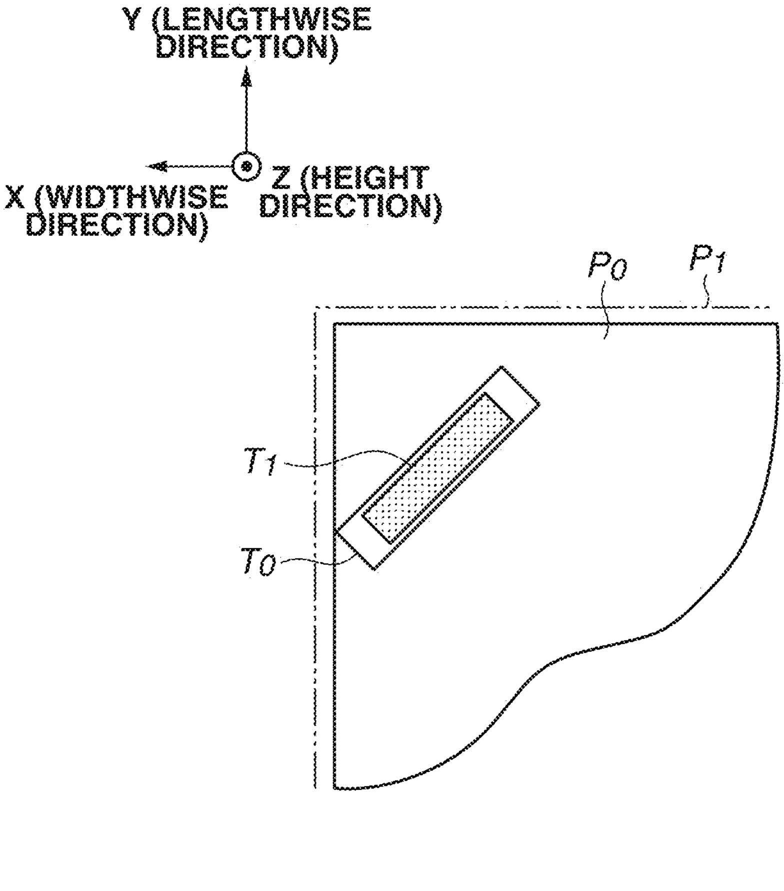
FIG. 10 is a diagram illustrating an adhesive toner image pattern according to a third embodiment.

FIG. 10 illustrates a relationship in shape and size between an adhesive toner image $T_0$ for bonding a front cover $P_0$ and a recording material $P_1$, which is the first middle page, together and an adhesive toner image $T_1$ for bonding recording materials $P_1$ and $P_2$, which are middle pages, together. The adhesive toner images $T_0$ and $T_1$ are both rectangular and are formed diagonally to the sides of the recording material in a corner of the recording material. Since the adhesive toner image $T_0$ is greater in area than the adhesive toner image $T_1$, even in a case where the adhesive toner image $T_1$ is misaligned from the adhesive toner image $T_0$, the appearance quality of the booklet is prevented from worsening for the same reason as in the first and second embodiments.

Figure 11:
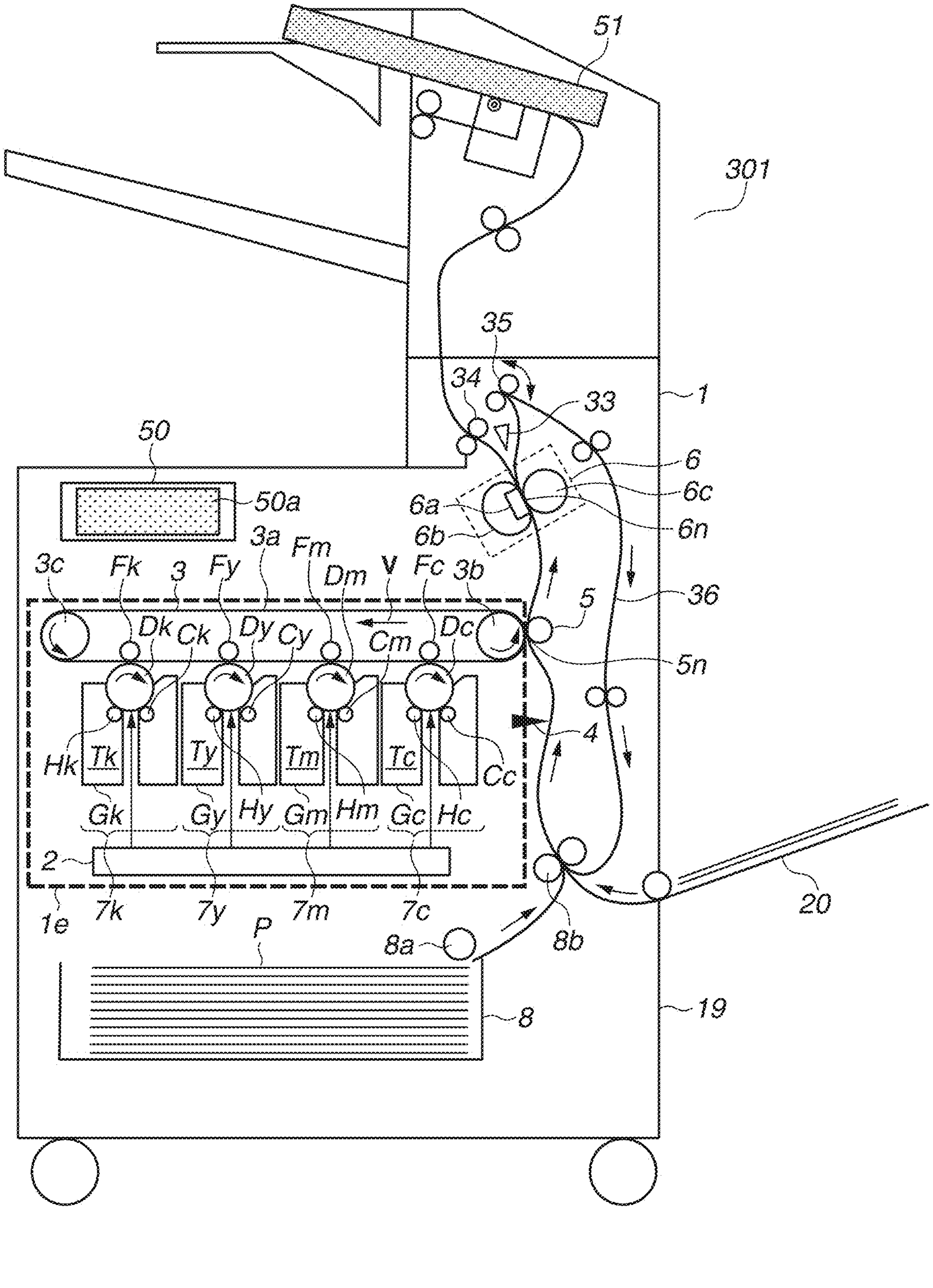
FIG. 11 is a cross-sectional view illustrating an image forming apparatus and a booklet generation apparatus according to a modified example of the present invention.

While the booklet generation apparatus 300 including the thermal compression bonding unit 51 is placed next to the image forming apparatus 1 according to the first to third embodiments, a top-mounted booklet generation apparatus 301 and the thermal compression bonding unit 51 may be placed on top of the body of the image forming apparatus 1 as illustrated in FIG. 11 as a modified example.

APPENDIX

The embodiments disclose at least the following image forming systems.

(Item 1)

An image forming system including an image forming apparatus configured to form an adhesive toner image on a recording material and a booklet generation apparatus configured to generate a booklet including a recording material to be a front cover, a recording material to be a back cover, and two or more recording materials to be middle pages between the front cover and the back cover, the booklet generation apparatus including a thermal compression bonding unit configured to heat and press an adhesive toner image portion in a state where a plurality of recording materials each with the adhesive toner image formed thereon is stacked in order to bond the plurality of recording materials together, wherein each adhesive toner image is formed so that at least one of the adhesive toner image bonding the front cover and the middle page together and the adhesive toner image bonding the back cover and the middle page together becomes greater in area than the adhesive toner image bonding the middle pages together when viewed from a direction perpendicular to a surface of the recording material, and wherein the booklet is generated so that the adhesive toner image bonding the front cover and the middle page together, the adhesive toner image bonding the back cover and the middle page together, and the adhesive toner image bonding the middle pages together overlap when viewed from the direction perpendicular to the surface of the recording material.

(Item 2)

The image forming system according to item 1, wherein the adhesive toner image bonding the front cover and the middle page together and the adhesive toner image bonding the back cover and the middle page together are formed in a rectangular shape so that a longer side of the rectangular shape is aligned with a longer or shorter side of the recording material.

(Item 3)

The image forming system according to item 2, wherein each adhesive toner image is formed so that at least one of a shorter side of the adhesive toner image bonding the front cover and the middle page together and a shorter side of the adhesive toner image bonding the back cover and the middle page together becomes longer than a shorter side of the adhesive toner image bonding the middle pages together.

(Item 4)

The image forming system according to item 2, wherein each adhesive toner image is formed so that at least one of a longer side of the adhesive toner image bonding the front cover and the middle page together and a longer side of the adhesive toner image bonding the back cover and the middle page together becomes longer than a longer side of the adhesive toner image bonding the middle pages together.

(Item 5)

The image forming system according to item 1, wherein the adhesive toner image bonding the front cover and the middle page together and the adhesive toner image bonding the back cover and the middle page together are formed in a rectangular shape in a corner portion formed by longer and shorter sides of the recording material.

(Item 6)

The image forming system according to item 5, wherein each adhesive toner image is formed so that at least one of a shorter side of the adhesive toner image bonding the front cover and the middle page together and a shorter side of the adhesive toner image bonding the back cover and the middle page together becomes longer than a shorter side of the adhesive toner image bonding the middle pages together.

(Item 7)

The image forming system according to item 5, wherein each adhesive toner image is formed so that at least one of a longer side of the adhesive toner image bonding the front cover and the middle page together and a longer side of the adhesive toner image bonding the back cover and the middle page together becomes longer than a longer side of the adhesive toner image bonding the middle pages together.

(Item 8)

The image forming system according to item 1, wherein the adhesive toner image bonding the front cover and the middle page together and the adhesive toner image bonding the back cover and the middle page together are formed in a triangular shape in a corner portion formed by longer and shorter sides of the recording material.

(Item 9)

The image forming system according to item 8, wherein the adhesive toner image bonding the middle pages together is formed in a triangular shape in the corner portion formed by the longer and shorter sides of the recording material.

(Item 10)

The image forming system according to any one of items 1 to 9, wherein at least one of a shape or area of the adhesive toner image bonding the front cover and the middle page together and a shape or area of the adhesive toner image bonding the back cover and the middle page together is changed based on a type of the recording material.

(Item 11)

The image forming system according to any one of items 1 to 10, wherein at least one of a shape or area of the adhesive toner image bonding the front cover and the middle page together and a shape or area of the adhesive toner image bonding the back cover and the middle page together is changed based on an operating environment of the booklet generation apparatus.

(Item 12)

The image forming system according to any one of items 1 to 11, wherein the image forming apparatus is configured to form a toner image in a region other than a region where the adhesive toner image is formed on the recording material, wherein the booklet generation apparatus includes an alignment roller configured to align the plurality of recording materials, and wherein at least one of a shape or area of the adhesive toner image bonding the front cover and the middle page together and a shape or area of the adhesive toner image bonding the back cover and the middle page together is changed based on at least one of an image pattern on a portion of the toner image other than the adhesive toner image formed on the recording material and a printing rate of the portion, the portion being in contact with the alignment roller.

(Item 13)

The image forming system according to any one of items 1 to 12, wherein the booklet is generated so that the adhesive toner image bonding the middle pages together entirely overlaps with the adhesive toner image bonding the front cover and the middle page together when the generated booklet is viewed from a direction perpendicular to a surface of the front cover.

The present invention makes it possible to prevent the appearance and quality of a booklet from worsening even in a case where an adhesive toner image is formed at a misaligned position on each recording material.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2023-149009, filed Sep. 14, 2023, which is hereby incorporated by reference herein in its entirety.

What is claimed is:

1. An image forming system comprising:

an image forming apparatus configured to form an adhesive toner image on a recording material; and a booklet generation apparatus configured to generate a booklet including a recording material to be a front cover, a recording material to be a back cover, and two or more recording materials to be middle pages between the front cover and the back cover, the booklet generation apparatus including a thermal compression bonding unit configured to heat and press an adhesive toner image portion in a state where a plurality of recording materials each with the adhesive toner image formed thereon is stacked in order to bond the plurality of recording materials together, wherein each adhesive toner image is formed so that at least one of a first area of the adhesive toner image bonding the front cover and the middle page together and a second area of the adhesive toner image bonding the back cover and the middle page together is greater than a third area of the adhesive toner image bonding the middle pages together when viewed in a direction in which the thermal compression bonding unit is configured to press the adhesive toner image, and wherein the booklet is generated so that at least one of a first area of the adhesive toner image bonding the front cover and the middle page together and a second area of the adhesive toner image bonding the back cover and the middle page together entirely includes a third area of the adhesive toner image bonding the middle pages together when viewed in the direction in which the thermal compression bonding unit is configured to press the adhesive toner image.

2. The image forming system according to claim 1, wherein the adhesive toner image bonding the front cover and the middle page together and the adhesive toner image bonding the back cover and the middle page together are formed in a rectangular shape so that a longer side of the rectangular shape is aligned with a longer or shorter side of the recording material.

3. The image forming system according to claim 2, wherein each adhesive toner image is formed so that at least one of a shorter side of the adhesive toner image bonding the front cover and the middle page together and a shorter side of the adhesive toner image bonding the back cover and the middle page together becomes longer than a shorter side of the adhesive toner image bonding the middle pages together.

4. The image forming system according to claim 2, wherein each adhesive toner image is formed so that at least one of a longer side of the adhesive toner image bonding the front cover and the middle page together and a longer side of the adhesive toner image bonding the back cover and the middle page together becomes longer than a longer side of the adhesive toner image bonding the middle pages together.

5. The image forming system according to claim 1, wherein the adhesive toner image bonding the front cover and the middle page together and the adhesive toner image bonding the back cover and the middle page together are formed in a rectangular shape in a corner portion formed by longer and shorter sides of the recording material.

6. The image forming system according to claim 5, wherein each adhesive toner image is formed so that at least one of a shorter side of the adhesive toner image bonding the front cover and the middle page together and a shorter side of the adhesive toner image bonding the back cover and the middle page together becomes longer than a shorter side of the adhesive toner image bonding the middle pages together.

7. The image forming system according to claim 5, wherein each adhesive toner image is formed so that at least one of a longer side of the adhesive toner image bonding the front cover and the middle page together and a longer side of the adhesive toner image bonding the back cover and the middle page together becomes longer than a longer side of the adhesive toner image bonding the middle pages together.

8. The image forming system according to claim 1, wherein the adhesive toner image bonding the front cover and the middle page together and the adhesive toner image bonding the back cover and the middle page together are formed in a triangular shape in a corner portion formed by longer and shorter sides of the recording material.

9. The image forming system according to claim 8, wherein the adhesive toner image bonding the middle pages together is formed in a triangular shape in the corner portion formed by the longer and shorter sides of the recording material.

10. The image forming system according to claim 1, wherein at least one of (i) a shape or area of the adhesive toner image bonding the front cover and the middle page together and (ii) a shape or area of the adhesive toner image bonding the back cover and the middle page together is changed based on a type of the recording material.

11. The image forming system according to claim 1, wherein at least one of (i) a shape or area of the adhesive toner image bonding the front cover and the middle page together and (ii) a shape or area of the adhesive toner image bonding the back cover and the middle page together is changed based on an operating environment of the booklet generation apparatus.

12. The image forming system according to claim 1, wherein the image forming apparatus is configured to form a toner image in a region other than a region where the adhesive toner image is formed on the recording material, wherein the booklet generation apparatus includes an alignment roller configured to align the plurality of recording materials, and wherein at least one of (i) a shape or area of the adhesive toner image bonding the front cover and the middle page together and (ii) a shape or area of the adhesive toner image bonding the back cover and the middle page together is changed based on at least one of an image pattern on a portion of the toner image other than the adhesive toner image formed on the recording material and a printing rate of the portion, the portion being in contact with the alignment roller.

13. The image forming system according to claim 1, wherein the booklet is generated so that the adhesive toner image bonding the middle pages together entirely overlaps with the adhesive toner image bonding the front cover and the middle page together when the generated booklet is viewed from a direction perpendicular to a surface of the front cover.

* * * * *